US011444696B2

(12) United States Patent
Dutt et al.

(10) Patent No.: US 11,444,696 B2
(45) Date of Patent: Sep. 13, 2022

(54) MICRO-DISC MODULATOR, SILICON PHOTONIC DEVICE AND OPTOELECTRONIC COMMUNICATION APPARATUS USING THE SAME

(71) Applicant: PhotonIC International Pte. Ltd., Singapore (SG)

(72) Inventors: Birendra Dutt, Westchester, CA (US); Ashok Kapoor, Palo Alto, CA (US); Weiwei Song, Mountain View, CA (US); Raj Rajasekharan, Cupertino, CA (US)

(73) Assignee: PhotonIC International Pte. Ltd., Singapore (SG)

(*) Notice: Subject to any disclaimer, the term of this patent is extended or adjusted under 35 U.S.C. 154(b) by 0 days.

(21) Appl. No.: 14/326,364

(22) Filed: Jul. 8, 2014

(65) Prior Publication Data

US 2016/0013865 A1     Jan. 14, 2016

(51) Int. Cl.
| | |
|---|---|
| *H04B 10/00* | (2013.01) |
| *H04B 10/40* | (2013.01) |
| *H04B 10/50* | (2013.01) |
| *H04J 14/02* | (2006.01) |
| *G02B 6/293* | (2006.01) |
| *H04B 10/66* | (2013.01) |
| *G02B 6/12* | (2006.01) |

(Continued)

(52) U.S. Cl.
CPC ......... *H04B 10/40* (2013.01); *G02B 6/12007* (2013.01); *G02B 6/29341* (2013.01); *G02B 6/4295* (2013.01); *G02B 6/43* (2013.01); *G02F 1/0147* (2013.01); *G02F 1/025* (2013.01); *H04B 10/50* (2013.01); *H04B 10/501* (2013.01); *H04B 10/516* (2013.01); *H04B 10/66* (2013.01); *H04J 14/02* (2013.01); *G02F 2201/18* (2013.01); *G02F 2202/105* (2013.01); *G02F 2203/055* (2013.01); *G02F 2203/15* (2013.01); *G02F 2203/69* (2013.01)

(58) Field of Classification Search
USPC ................................................... 398/182–201
See application file for complete search history.

(56) References Cited

U.S. PATENT DOCUMENTS

| | | | | |
|---|---|---|---|---|
| 4,997,246 | A | * | 3/1991 | May ....................... G02F 1/025 385/2 |
| 6,009,115 | A | | 12/1999 | Ho |

(Continued)

*Primary Examiner* — Agustin Bello
(74) *Attorney, Agent, or Firm* — David R. Stevens; Stevens Law Group

(57) ABSTRACT

Various embodiments of a micro-disc modulator as well as a silicon photonic device and an optoelectronic communication apparatus using the micro-disc modulator are described. In one aspect, a device includes a SOI substrate and a silicon photonic structure formed on a primary surface of the SOI substrate. The semiconductor substrate includes a silicon waveguide and a micro-disc modulator. The micro-disc modulator is adjacent to the silicon waveguide and has a top surface substantially parallel to the primary surface of the SOI substrate. The top surface of the micro-disc modulator includes one or more discontinuities therein. The micro-disc modulator may be a multi junction micro-disc modulator having two vertical p-n junctions with a single resonance frequency to achieve high-speed modulation and low-power consumption.

21 Claims, 20 Drawing Sheets

(51) Int. Cl.
*G02B 6/42* (2006.01)
*G02B 6/43* (2006.01)
*G02F 1/01* (2006.01)
*G02F 1/025* (2006.01)
*H04B 10/516* (2013.01)

(56) References Cited

U.S. PATENT DOCUMENTS

| | | | | |
|---|---|---|---|---|
| 6,859,113 | B2 * | 2/2005 | Giousouf | H03B 5/30 331/116 M |
| 7,145,660 | B2 * | 12/2006 | Margalit | G01N 21/7746 356/477 |
| 7,401,397 | B2 * | 7/2008 | Shcheglov | G01C 19/5684 29/592.1 |
| 7,436,271 | B2 * | 10/2008 | Weinstein | H03H 3/0072 333/186 |
| 7,764,850 | B2 * | 7/2010 | Bratkovski | G02F 1/025 385/131 |
| 7,764,852 | B2 * | 7/2010 | Ty Tan | B82Y 20/00 385/14 |
| 7,941,014 | B1 * | 5/2011 | Watts | B82Y 20/00 385/2 |
| 7,982,686 | B2 * | 7/2011 | Cahill | H01Q 15/004 343/909 |
| 7,983,517 | B1 * | 7/2011 | Watts | G02B 6/29335 385/32 |
| 8,189,968 | B2 * | 5/2012 | Chen | B82Y 20/00 385/12 |
| 8,350,445 | B1 * | 1/2013 | Shirakawa | H03H 3/02 310/320 |
| 8,515,216 | B2 * | 8/2013 | Abad | B82Y 20/00 385/14 |
| 8,538,214 | B2 * | 9/2013 | Chen | G01N 21/7746 385/15 |
| 8,554,022 | B1 * | 10/2013 | Hochberg | H01L 29/66977 257/21 |
| 8,666,206 | B2 * | 3/2014 | Pomerene | G02B 1/11 385/14 |
| 8,670,476 | B2 * | 3/2014 | Goddard | G02B 6/12007 372/102 |
| 8,798,406 | B1 * | 8/2014 | Hochberg | B82Y 20/00 385/14 |
| 8,909,003 | B1 * | 12/2014 | Hochberg | G02F 1/011 385/12 |
| 8,923,700 | B2 * | 12/2014 | Socci | H04J 14/0204 398/85 |
| 9,093,428 | B2 | 7/2015 | Liang | |
| 9,103,975 | B2 * | 8/2015 | Yu | G02B 6/12007 |
| 9,134,169 | B2 * | 9/2015 | Li | G01J 1/0209 |
| 9,188,798 | B2 * | 11/2015 | Taylor | G02B 6/12007 |
| 9,239,475 | B2 * | 1/2016 | Akiyama | G02F 1/0121 |
| 9,261,754 | B2 * | 2/2016 | Xu | G02F 1/353 |
| 9,268,195 | B1 * | 2/2016 | Camacho | G02F 1/3536 |
| 2003/0058908 | A1 | 3/2003 | Griffel | |
| 2004/0055380 | A1 * | 3/2004 | Shcheglov | G01C 19/5684 73/504.12 |
| 2004/0126054 | A1 | 7/2004 | Griffel | |
| 2004/0146431 | A1 * | 7/2004 | Scherer | G01N 21/7746 422/82.05 |
| 2007/0103258 | A1 * | 5/2007 | Weinstein | H03H 3/0072 333/186 |
| 2008/0204355 | A1 * | 8/2008 | Cahill | H01Q 15/004 343/909 |
| 2009/0190875 | A1 * | 7/2009 | Bratkovski | G02F 1/025 385/2 |
| 2010/0266232 | A1 * | 10/2010 | Lipson | G02F 1/025 385/1 |
| 2010/0266233 | A1 * | 10/2010 | Morris | G01C 19/721 385/2 |
| 2011/0149285 | A1 * | 6/2011 | Chen | G01N 21/7746 356/432 |
| 2012/0062974 | A1 * | 3/2012 | Manipatruni | G02F 1/011 359/238 |
| 2012/0281957 | A1 * | 11/2012 | Chamanzar | B82Y 20/00 385/131 |
| 2014/0110572 | A1 * | 4/2014 | Li | G01J 1/0209 250/227.23 |
| 2015/0168146 | A1 * | 6/2015 | Shcheglov | G01C 19/5733 73/504.13 |
| 2016/0013865 | A1 * | 1/2016 | Dutt | H04B 10/516 398/139 |

\* cited by examiner

Cross-Section of Single-Junction Disc Modulator

N++/P++: for electrode contact
N+: connect the n-region to the N++ region to reduce the resistance and capacitance of the device
i-silicon: intrinsic silicon to reduce the capacitance
N/P: n-region/p-region of the p-n junction

MICRO-DISC MODULATOR, SILICON PHOTONIC DEVICE AND OPTOELECTRONIC COMMUNICATION APPARATUS USING THE SAME

TECHNICAL FIELD

The present disclosure relates to optoelectronic systems and, more particularly, to a novel micro-disc modulator as well as a silicon photonic device and an optoelectronic communication apparatus using the micro-disc modulator.

BACKGROUND

A silicon photonic device is a device containing a photonic system which uses silicon as an optical medium. The silicon layer used as optical media typically lies on top of a layer of silica, also known as silicon dioxide, which, in turn, lies on top of a silicon substrate and is known as silicon on insulator (SOI).

An optical modulator is an essential component in an optoelectronic communication system using silicon photonic devices. An optical modulator is an optical device in which an electrical signal-controlled element is used to modulate light in an isolated medium, such as waveguide, using electro-optic effects. Characteristics of a beam of input light, e.g., laser, including phase, frequency, amplitude and direction, may be modulated with an optical modulator. The main features usually required of an optical modulator for integration with silicon photonic devices are, typically, high speed, high modulation depth, low losses, low power consumption, small volume and reliability. Optical modulators may be used for intra-chip communication, e.g., in silicon photonic devices, in which high speed, small volume, and CMOS process compatibility are required.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

DETAILED DESCRIPTION

Overview

The present disclosure provides a novel design of a micro-disc modulator with a number of benefits and advantages over existing designs of optical modulators. The proposed micro-disc modulator requires an operating voltage as low as 0.5V and dissipates power of less than 10 fW per bit (fW/b). The diameter of an example micro-disc may be less than 6 μm with a free spectral range (FSR) of 45 nm. The property of an example micro-disc modulator in accordance with the present disclosure allows tuning of resonance frequency with temperature.

The present disclosure also provides a novel vertical multi junction micro-disc modulator. An example vertical multi junction micro-disc modulator has a single resonance frequency. The proposed design can seamlessly integrate with high-performance complementary metal-oxide-semiconductor (CMOS) technology, and requires no special drivers. Compared with other industry-standard micro-ring or micro-disc modulators and photonic circuits, the proposed design allows for stable, high-speed and low-power operation.

The present disclosure further provides a novel optoelectronic communication apparatus having an optical link with heaters. The proposed design utilizes heaters for thermal tuning of modulators (e.g., micro-disc modulators in accordance with the present disclosure or other suitable modulators) to reduce the required footprint and power consumption, thus providing an area and power-efficient solution.

Example Embodiments

Figure 1A:
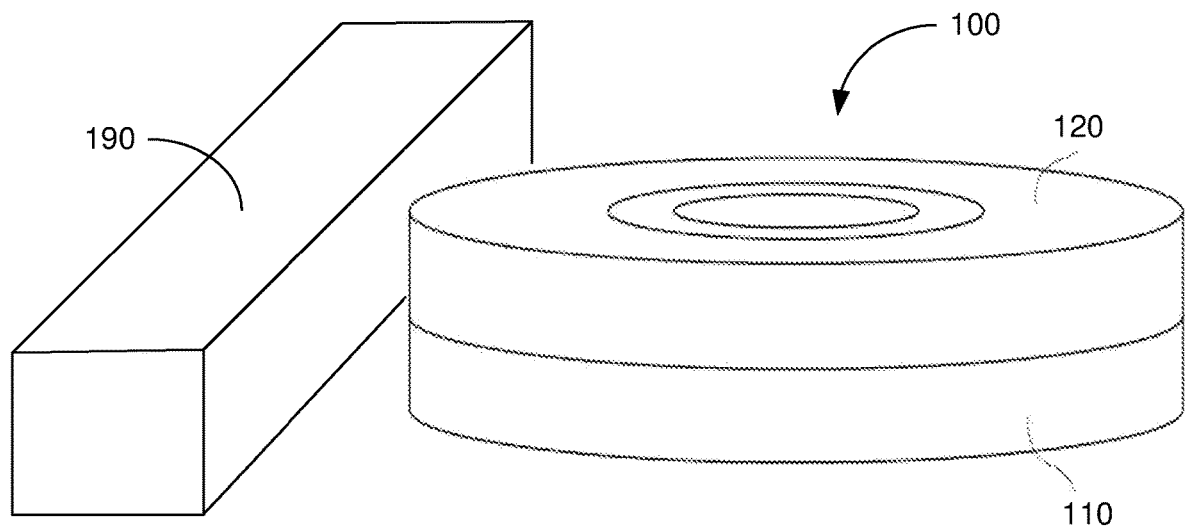
FIG. 1A is a diagram depicting a perspective view of an example micro-disc modulator in accordance with an embodiment of the present disclosure.
Figure 1B:
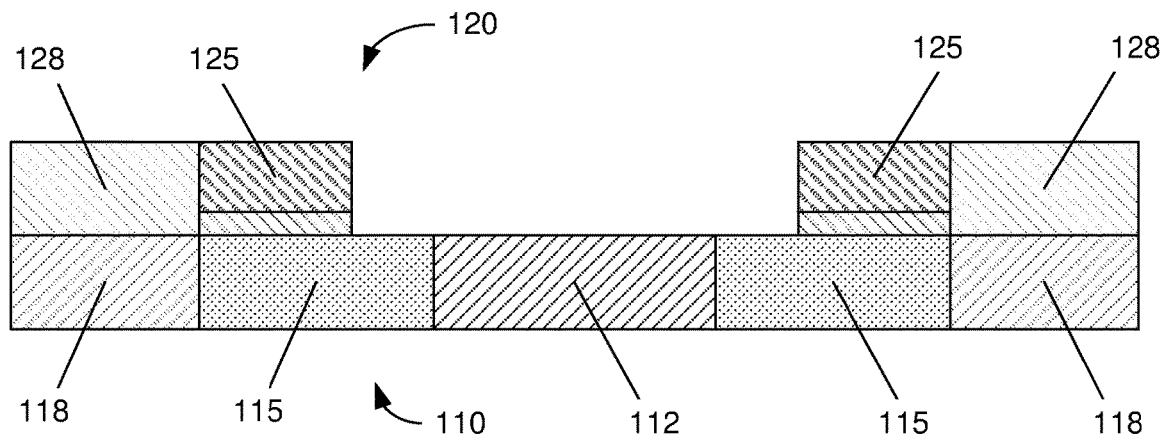
FIG. 1B is a diagram depicting a cross-sectional impurity profile of an example micro-disc modulator in accordance with an embodiment of the present disclosure.

FIGS. 1A and 1B depict a perspective view and a cross-sectional profile of an example micro-disc modulator 100 in accordance with an embodiment of the present disclosure. In particular, FIG. 1A shows a perspective view of example micro-disc modulator 100 and FIG. 1B shows a cross-sectional profile of example micro-disc modulator 100.

Example micro-disc modulator 100 is part of a silicon photonic device (not shown) in which a silicon photonic structure containing example micro-disc modulator 100 is formed on top of a primary surface, e.g., of an oxide layer formed on top of a substrate. The substrate may be, for example, a silicon-based substrate such as a SOI substrate. As shown in FIGS. 1A and 1B, example micro-disc modulator 100 is a vertical p-n junction modulator and includes a first layer 110 and a second layer 120 disposed on the first layer 110. In the example implementation shown in FIG. 1A, example micro-disc modulator 100 is disposed in the proximity of a silicon waveguide 190. The first layer 110 may include a first first-type region doped with first-type dopants. The second layer 120 may include a second-type region doped with second-type dopants and in contact with the first first-type region of the first layer 110. The first first-type region in the first layer 110 and the second-type region in the second layer 120 form a p-n junction in which current flow is perpendicular to the primary surface of the SOI substrate on which example micro-disc modulator 100 is formed.

In the present disclosure, a first-type region refers to a region doped with first-type dopants, whether lightly doped or heavily doped. Similarly, in the present disclosure, a second-type region refers to a region doped with second-type dopants, whether lightly doped or heavily doped. In some embodiments, the first-type dopants are n-type dopants and the second-type dopants are p-type dopants. In alternative embodiments, the first-type dopants are p-type dopants and the second-type dopants are n-type dopants. Thus, in the illustrated examples, a first layer may be doped with the first-type dopants, a second layer may be doped with the second-type dopants, and so on. However, in alternative embodiments that are not shown, the first layer may be doped the second-type dopants, the second layer may be doped with the first-type dopants, and so on.

The first layer 110 may be a first ring-shaped layer that includes a first central region 115 and a first peripheral region 118. As shown in FIG. 1B, the first central region 115 of the first layer 110 may be heavily-doped with first-type dopants and function as a first electrode. The first peripheral region 118 of the first layer 110 surrounds the first central region 115, and is the first first-type region of the first layer 110. The second layer 120 may be a second ring-shaped layer that includes a second central region 125 and a second peripheral region 128. As shown in FIG. 1B, the second central region 125 may be heavily-doped with second-type dopants and function as a second electrode. The second central region 125 is shaped like a ring with the center thereof etched away. The second central region 125 is disposed on the first central region 115. The second peripheral region 128 of the second layer 120 surrounds the second central region 125, and is the second-type region of the second layer 120. The second peripheral region 128 is disposed on the first peripheral region 118. It is noteworthy that central region 125 and central region 115 need not be aligned.

As shown in FIG. 1B, example micro-disc modulator 100 first layer 110 and second layer 120. The first layer 110 includes a first core region 112 which is surrounded by the first central region 115, which in turn is surrounded by the first peripheral region 118. The first core region 112 is heavily doped with first-type dopants for making contact to cathode. The second layer 120 includes the second central region 125 which is surrounded by the second peripheral region 128. The second central region is heavily doped with second-type dopants for making contact to anode. The first peripheral region 118 and the second peripheral region 128 form an active region of the example micro-disc modulator 100.

In the depicted example implementation, a diameter of example micro-disc modulator 100 is approximately 4.8 μm, or 4800 nm. A thickness of example micro-disc modulator 100 is approximately 220 nm. In one embodiment, thickness of modulator 100 and thickness of waveguide 190 are substantially equal and may be approximately 220 nm. A coupling gap or nearest distance between example micro-disc modulator 100 and silicon waveguide 190 is approximately 150 nm. With both example micro-disc modulator 100 and silicon waveguide 190 being part of a silicon photonic structure, they may be formed during the same fabrication process.

Figure 1C:
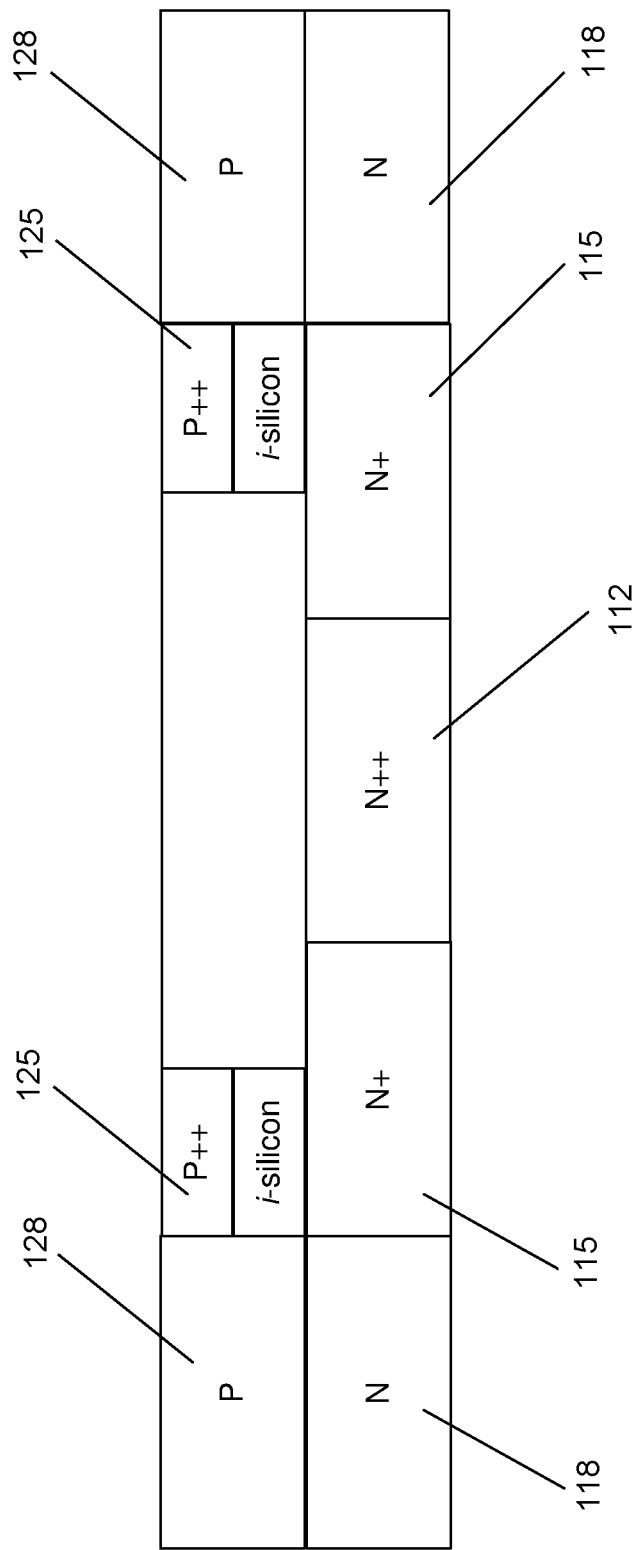
FIG. 1C is a diagram depicting a cross-sectional impurity profile of an example implementation of an example micro-disc modulator in accordance with an embodiment of the present disclosure.

FIG. 1C is a diagram depicting a cross-sectional impurity profile of an example implementation of example micro-disc modulator 100 in accordance with an embodiment of the present disclosure for the structure shown in FIG. 1B.

Figure 2A:
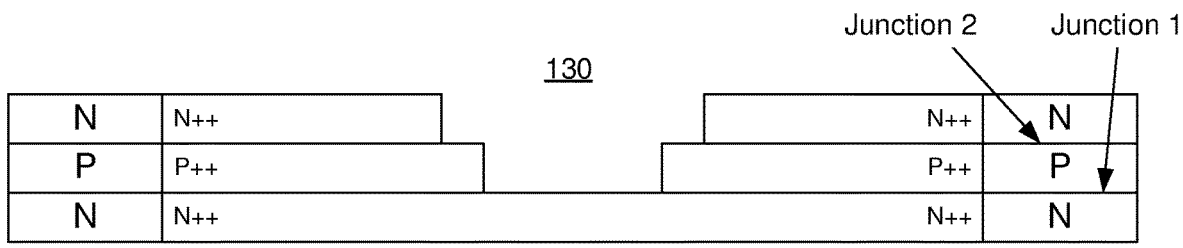
FIG. 2A is a diagram depicting a cross-sectional view of an example three-layer double junction micro-disc modulator in accordance with an embodiment of the present disclosure.

FIG. 2A is a diagram depicting a cross-section view of an example three-layer double junction micro-disc modulator 130 in accordance with an embodiment of the present disclosure. As shown in FIG. 2A, the modulator 130 includes a first disc-shaped layer with two ring-shaped layers disposed over the first disc-shaped layer. The modulator 130 includes two ring-shaped layers disposed over the first disc-shaped layer with the first disc-shaped layer and the two ring-shaped layers alternatively doped with first-type dopants and second-type dopants, thus forming two junctions.

Figure 2B:
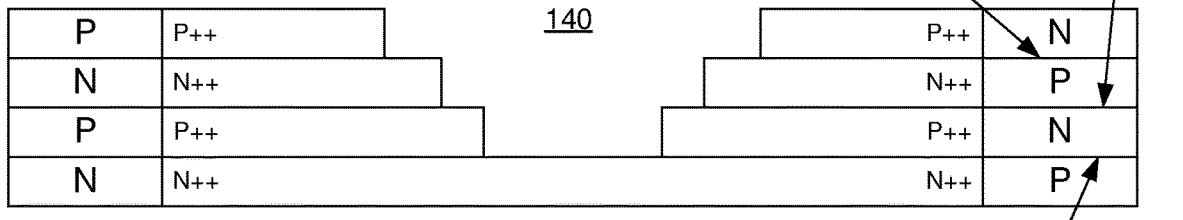
FIG. 2B is a diagram depicting a cross-sectional view of an example four-layer triple junction micro-disc modulator in accordance with an embodiment of the present disclosure.

FIG. 2B is a diagram depicting a cross-section view of an example four-layer triple junction micro-disc modulator 140 in accordance with an embodiment of the present disclosure. The modulator 140 includes three ring-shaped layers disposed over the first disc-shaped layer with the first disc-shaped layer and the three ring-shaped layers alternatively doped with first-type dopants and second-type dopants.

Figure 2C:
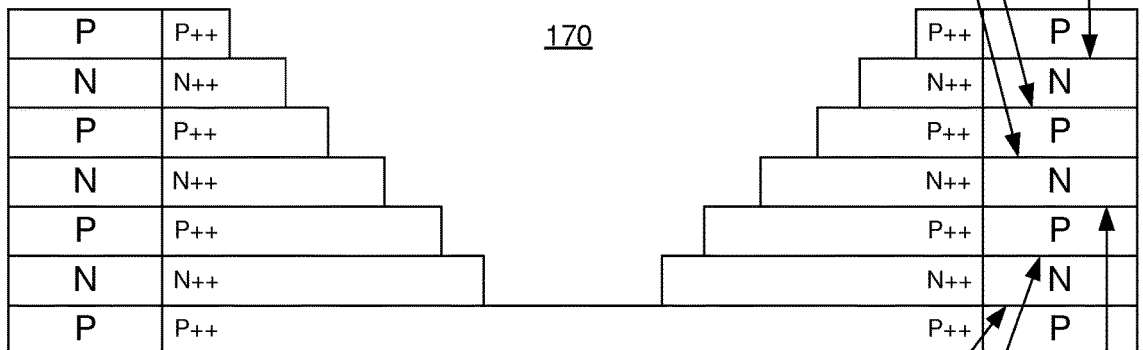
FIG. 2C is a diagram depicting a cross-sectional view of an example seven-layer multiple junction micro-disc modulator in accordance with an embodiment of the present disclosure.

FIG. 2C is a diagram depicting a cross-sectional view of an example seven-layer multiple junction micro-disc modulator 170 in accordance with an embodiment of the present disclosure. The modulator 170 includes six ring-shaped layers disposed over the first disc-shaped layer with the first disc-shaped layer and the six ring-shaped layers alternatively doped with first-type dopants and second-type dopants.

Figures 3A, 3B:
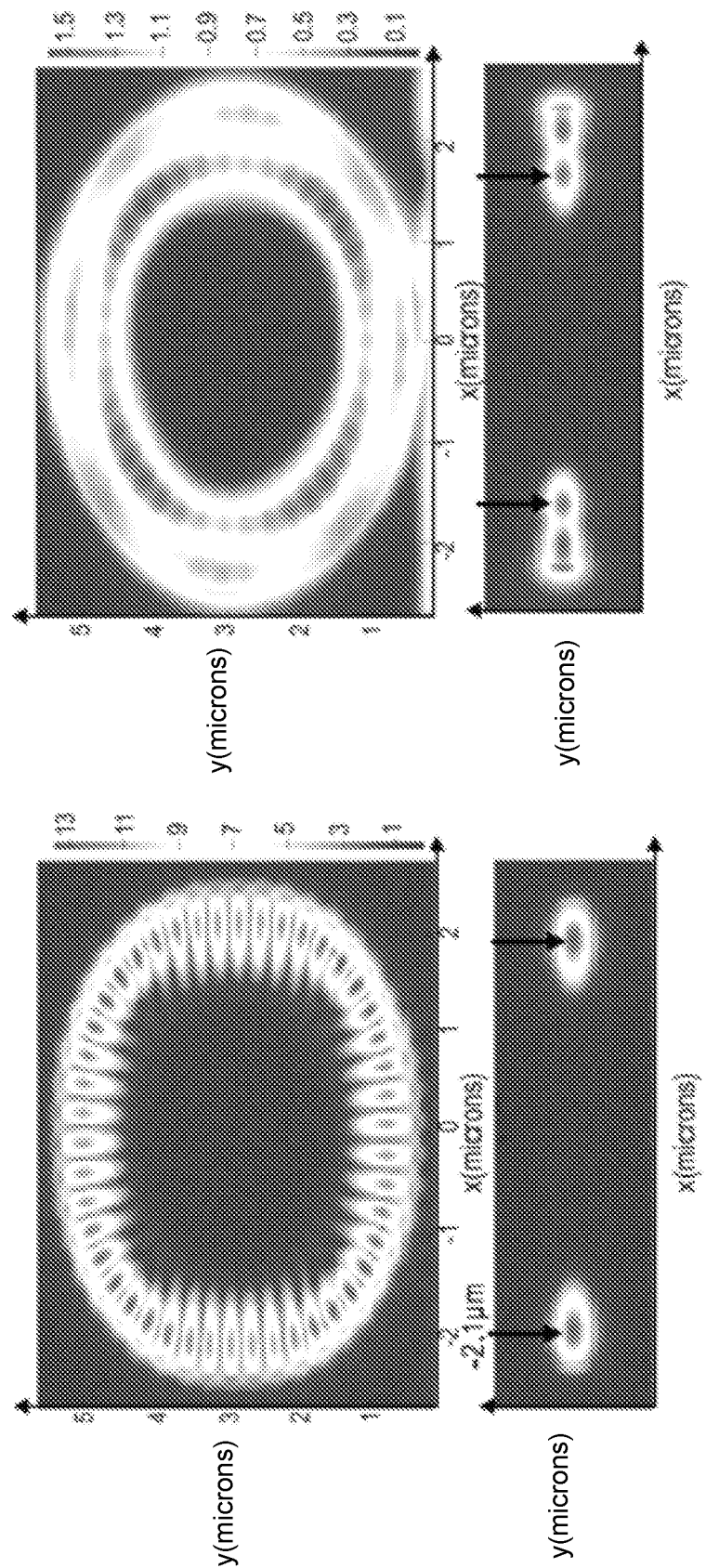
FIG. 3A is a diagram depicting locations of primary and secondary modes of resonance in an example micro-disc modulator in accordance with an embodiment of the present disclosure.
FIG. 3B is a diagram depicting locations of primary and secondary modes of resonance in another example micro-disc modulator in accordance with an embodiment of the present disclosure.

FIGS. 3A and 3B depict locations of primary and secondary modes of resonance in example micro-disc modulator 100 in accordance with an embodiment of the present disclosure. FIG. 3A shows locations of primary mode resonance in example micro-disc modulator 100 with a radius of 2.5 µm at wavelength 1580.37 nm. This mode lacks circular symmetry, as shown in FIG. 3A. Peak intensity of this mode is located at ~2.1 µm at the selected cross-section. FIG. 3B shows locations of secondary mode resonance in example micro-disc modulator 100 with multiple intensity peaks.

Referring to FIG. 3A, light path is not a perfect circle and is more like a square with rounded edges for the primary mode of resonance. Referring to FIG. 3B, the secondary mode of resonance shows two peaks. A major challenge is to eliminate the secondary mode (and higher modes) of resonance so that a single resonance can be achieved in the modulator.

Figure 3C:
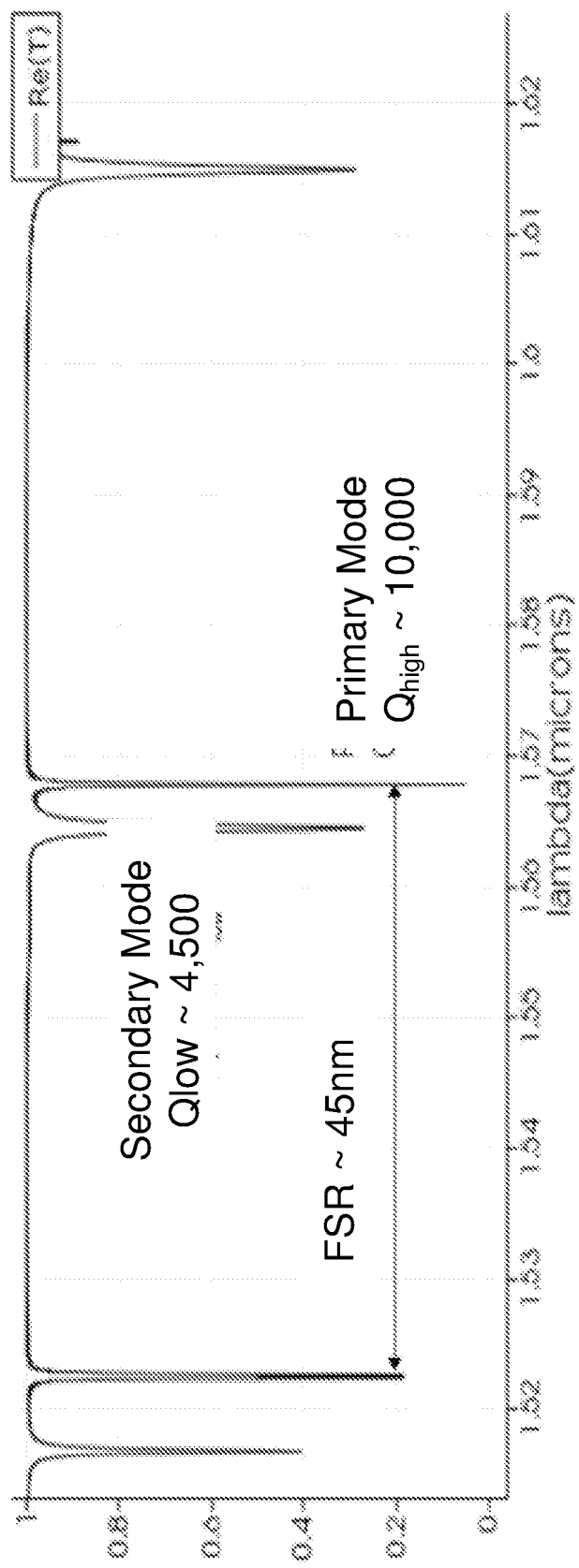
FIG. 3C is a chart showing simulated resonance spectrum from micro-disc modulators in accordance with an embodiment of the present disclosure.

FIG. 3C depicts simulated resonance spectrum from micro-disc modulators in accordance with an embodiment of the present disclosure, e.g., example micro-disc modulator 100 of FIG. 1. As shown in FIG. 3C, the simulated spectrum exhibits two sets of resonance, with the primary mode ($Q_{high}$) at approximately 10,000 and the secondary mode ($Q_{low}$) at approximately 4,500.

Figure 4:
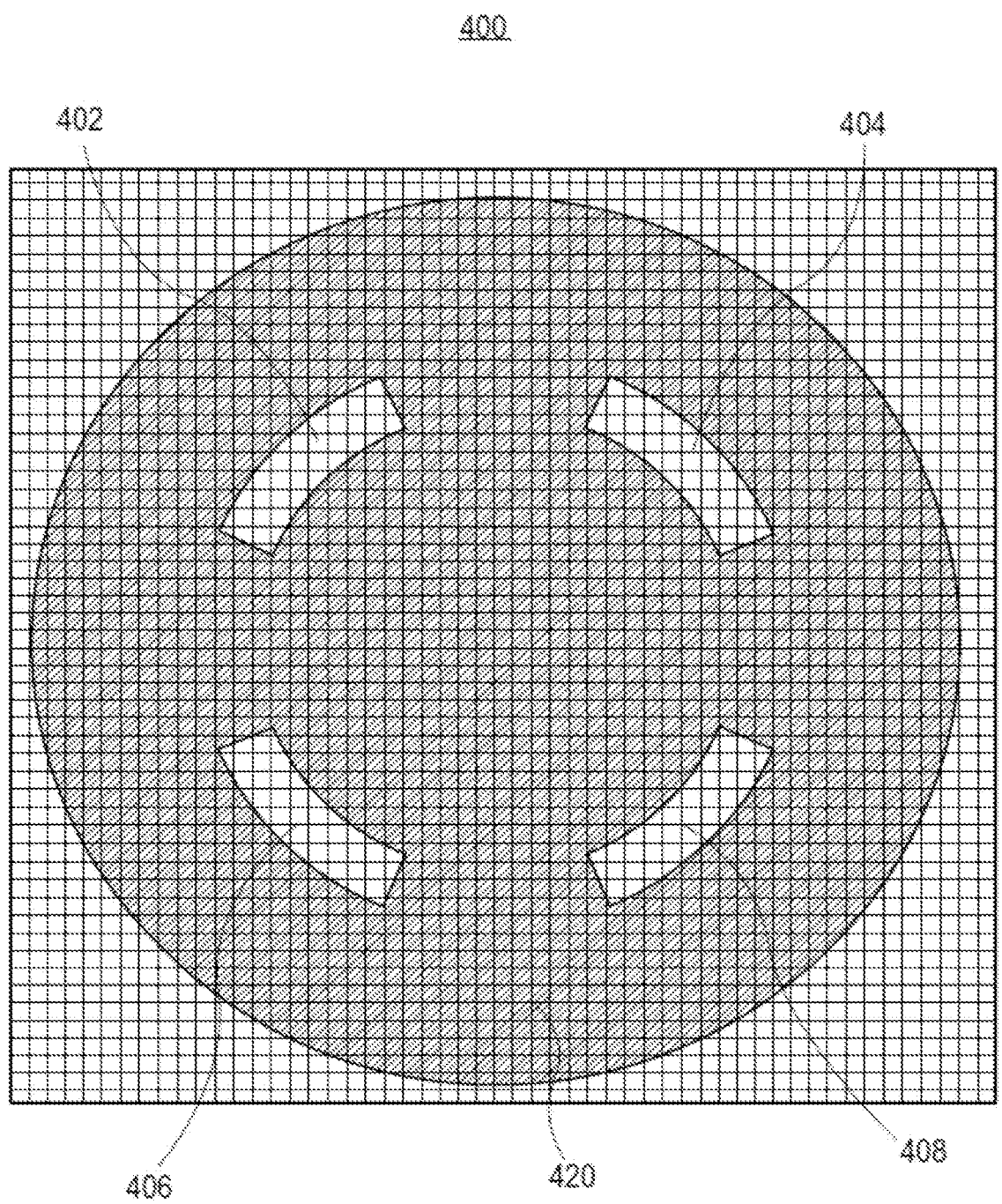
FIG. 4 is a diagram depicting a top view of an example micro-disc modulator in accordance with an embodiment of the present disclosure.

FIG. 4 is a diagram depicting a top view of an example micro-disc modulator 400 in accordance with an embodiment of the present disclosure.

Example micro-disc modulator 400 is part of a silicon photonic device (not shown) in which a silicon photonic structure containing example micro-disc modulator 400 is formed on top of a primary surface of a substrate. Example micro-disc modulator 400 is a vertical p-n junction modulator and includes a first layer (not shown) and a second layer 420 disposed on the first layer. As most features of example micro-disc modulator 400 are similar or identical to those of example micro-disc modulator 100, in the interest of brevity the description of example micro-disc modulator 400 provided below is focused on difference(s) between example micro-disc modulator 400 and example micro-disc modulator 100.

Different from example micro-disc modulator 100, a top surface of example micro-disc modulator 400, which is substantially parallel to the first primary surface of the SOI substrate, includes one or more discontinuities therein. As shown in FIG. 4, example micro-disc modulator 400 includes discontinuities 402, 404, 406 and 408 on the top surface thereof. Note that discontinuities are in the form of slots etched into the top surface of the modulator in shapes such as arc-shaped grooves. In various embodiments, the number, shape and location of the discontinuities in the form of slots may vary to achieve maximum suppression of higher order modes. In some embodiments, the one or more discontinuities may have a depth that traverses more than one layer of the micro-disc modulator. For example, at least one of the one or more discontinuities may have a depth that extends from the top surface of the top layer of a micro-disc modulator to one or more layers underneath the top layer extending to the full height of the body of 400.

Referring to FIG. 3B, each location of a peak of field intensity of the secondary mode of resonance allow for insertion of a discontinuity in the medium (i.e., silicon layer on SOI substrate) where the field intensity is the highest. The change in the effective refractive index in the coupling region due to discontinuity is designed for minimum perturbation of the primary mode. This maintains mode matching and high absorption at primary resonance and high extinction ratio. Moreover, electrical characteristics such as junction area and capacitance would be reduced slightly by the addition of one or more discontinuities such as discontinuities 402, 404, 406 and 408, which will benefit the performance of the micro-disc.

In some embodiments, the one or more discontinuities (e.g., discontinuities 402, 404, 406 and 408) may be disposed at locations that coincide with locations of the secondary mode (and higher modes) of resonance in example micro-disc modulator 400 corresponding to a predefined wavelength. In some embodiments, the locations of the one or more discontinuities may correspond to locations of peaks of field intensity of the secondary mode of resonance in example micro-disc modulator 400. Discontinuities may be combined or further divided to obtain the desired spectral response of the modulators.

In some embodiments, the one or more discontinuities (e.g., discontinuities 402, 404, 406 and 408) may include one or more grooves etched into the top surface of example micro-disc modulator 400. In some embodiments, the one or more grooves may include at least four arc-shaped grooves subtending an angle of 45 degrees and disposed 45 degrees apart around a circle centered at a center point of the top surface of example micro-disc modulator 400.

Figure 5A:
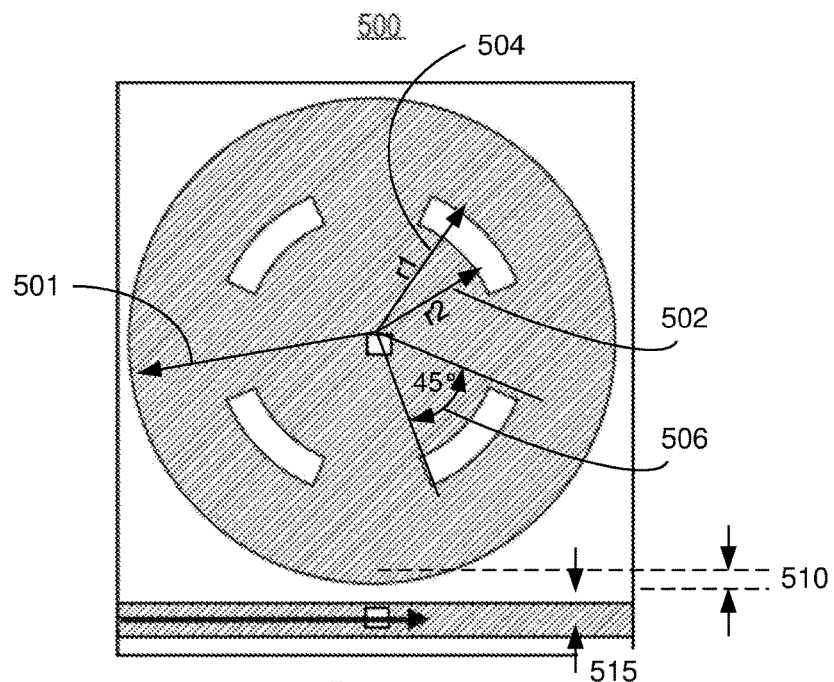
FIG. 5A is a diagram depicting a top view of an example micro-disc modulator in accordance with an embodiment of the present disclosure.
Figure 5B:
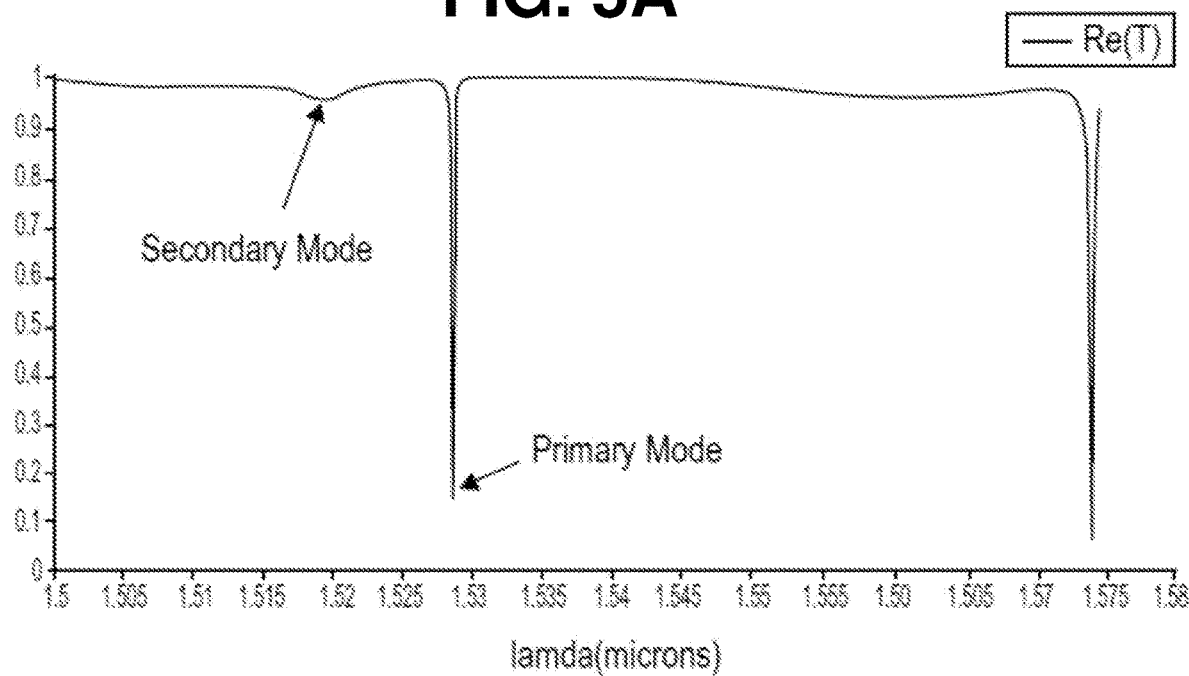
FIG. 5B is a diagram depicting mode profile simulation results of an example micro-disc modulator in accordance with an embodiment of the present disclosure.

FIG. 5A is a diagram depicting a top view of an example micro-disc modulator 500 in accordance with an embodiment of the present disclosure. FIG. 5B is a diagram depicting mode profile simulation results of example micro-disc modulator 500 as shown in FIG. 5a in accordance with an embodiment of the present disclosure.

As features of example micro-disc modulator 500 are similar or identical to those of example micro-disc modulator 400, in the interest of brevity a detailed description of example micro-disc modulator 500 is not provided. Nevertheless, parameters of example micro-disc modulator 500 are listed below.

The radius 501 of example micro-disc modulator 500 is 2.5 µm, or 2500 nm. The coupling gap 510 between example micro-disc modulator 510 and a silicon waveguide (e.g., silicon waveguide 230) is 0.15 μm, or 150 nm. The width of the silicon waveguide 515 is 0.4 μm, or 400 nm. The thickness of the micro-disc modulator 500 and silicon waveguide is 0.22 μm, or 220 nm. The etch depth of each of the discontinuities as arc-shaped grooves is 0.22 μm, or 220 nm. The etch width of each of the discontinuities as arc-shaped grooves is 0.3 μm, or 300 nm. Each of the discontinuities as arc-shaped grooves subtends 45-degree angle at the center of the disc. The outer radius r1 of each of the arc-shaped grooves, shown as object 504, is 1.6 μm, or 1600 nm. The inner radius r2 of each of the arc-shaped grooves, shown as object 502, is 1.3 μm, or 1300 nm. In some embodiments, the outer radius 504 of each of the arc-shaped grooves may be in the range of 1.5 μm-1.8 μm approximately. As shown in FIG. 5A, the arc of each arc-shaped groove spans an angle 506 approximately 45 degrees.

As shown in FIG. 5B, the secondary mode of resonance is largely removed while the primary mode of resonance is not influenced. The free spectral range (FSR) is approximately 45 nm. This design has a high Q factor of approximately 11000.

Figure 6:
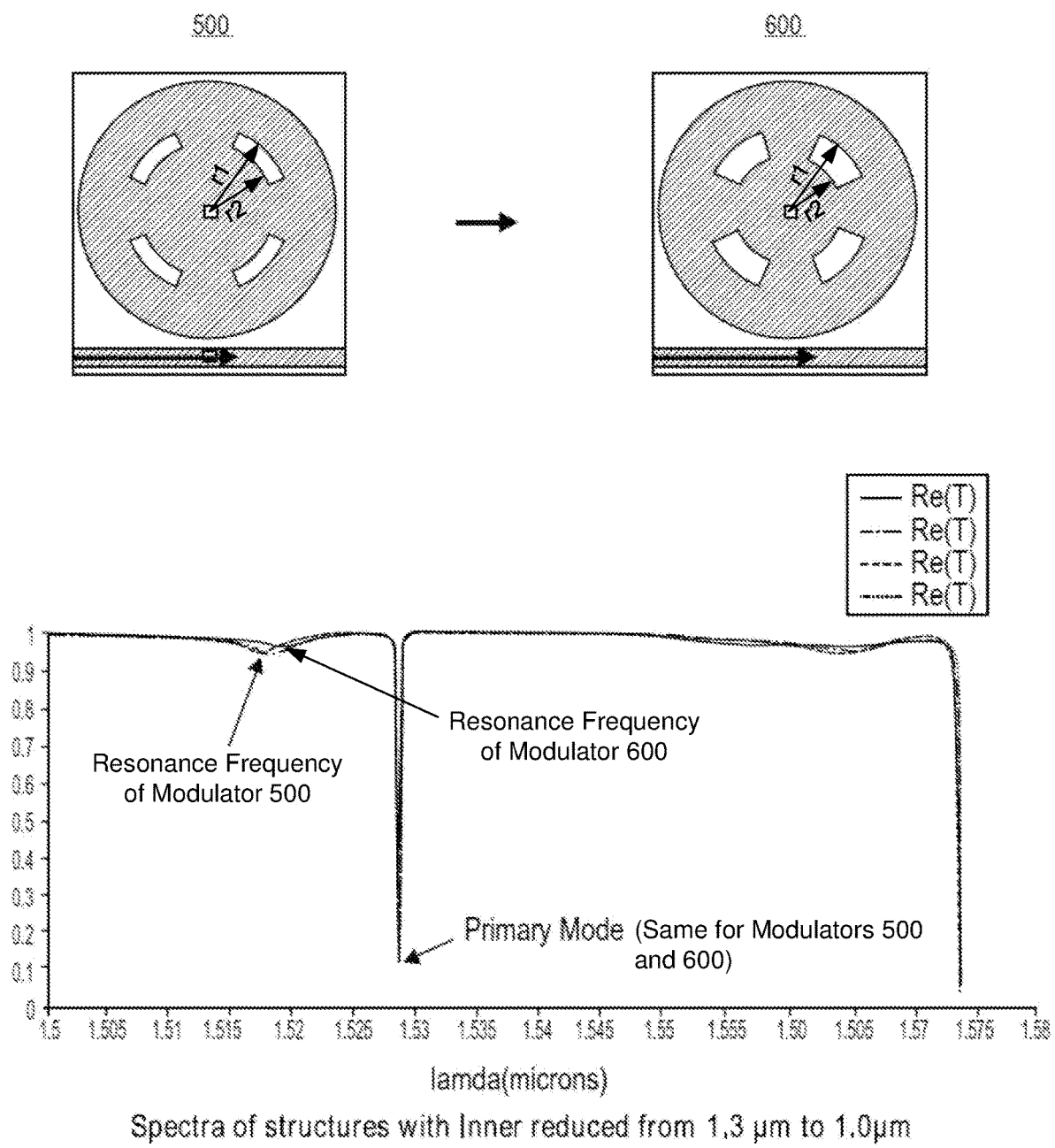
FIG. 6 is a diagram depicting mode profile simulation results of an example micro-disc modulator in accordance with another embodiment of the present disclosure.

FIG. 6 is a diagram depicting mode profile simulation results of an example micro-disc modulator 600 in accordance with an embodiment of the present disclosure.

As most features of example micro-disc modulator 600 are similar or identical to those of example micro-disc modulator 500, in the interest of brevity the description of example micro-disc modulator 600 provided below is focused on difference(s) between example micro-disc modulator 500 and example micro-disc modulator 600.

Compared with example micro-disc modulator 500, example micro-disc modulator 600 has reduced inner radius r2, from 1.3 μm to 1.0 μm, for each of the arc-shaped grooves while the outer radius r1 of each of the arc-shaped grooves remains unchanged at 1.6 μm. As shown in FIG. 6, the primary mode of resonance is not influenced while the secondary mode of resonance is suppressed.

Figure 7:
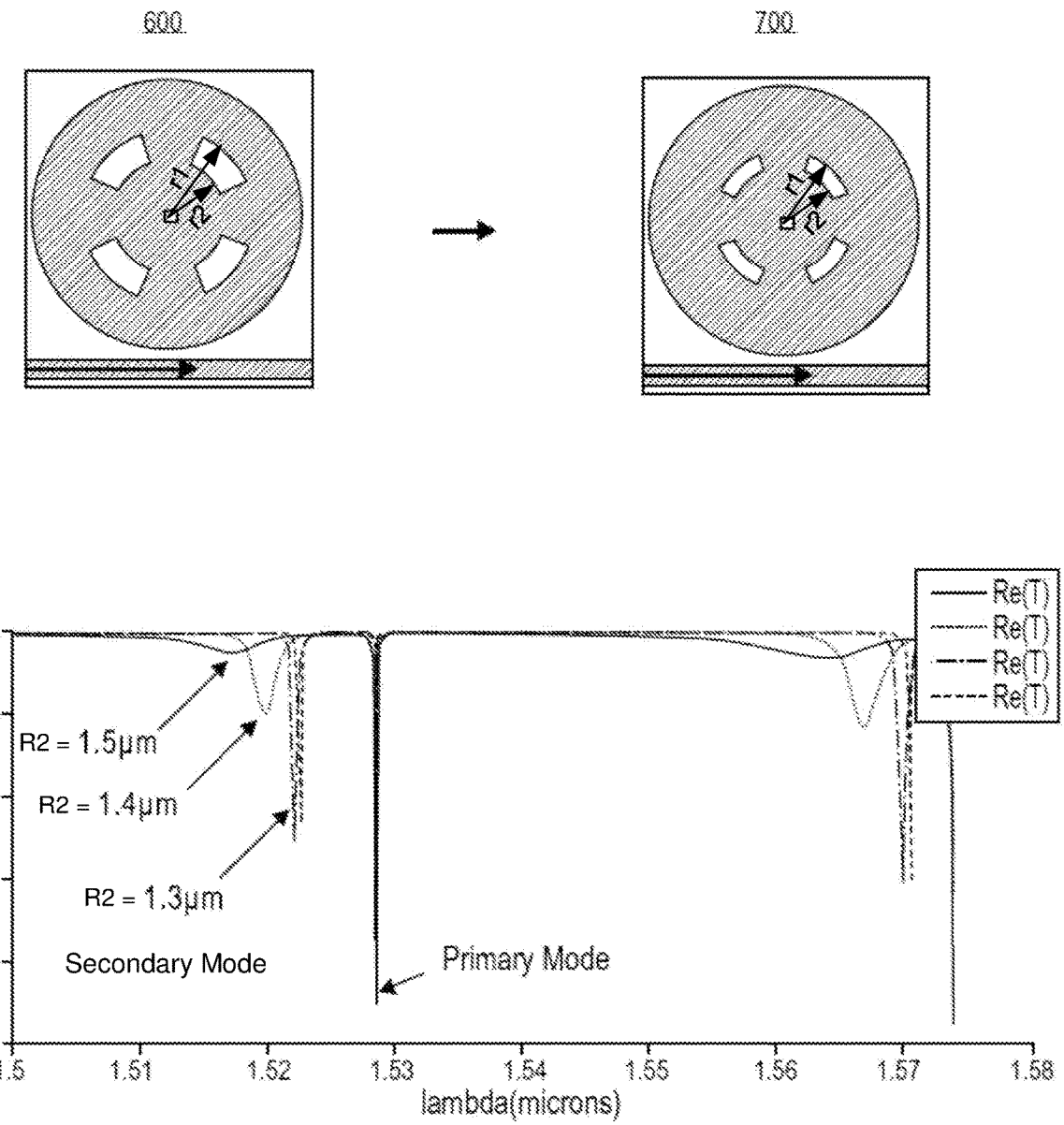
FIG. 7 is a diagram depicting mode profile simulation results of an example micro-disc modulator in accordance with still another embodiment of the present disclosure.

FIG. 7 is a diagram depicting mode profile simulation results of an example micro-disc modulator 700 in accordance with still another embodiment of the present disclosure.

As most features of example micro-disc modulator 700 are similar or identical to those of example micro-disc modulator 600, in the interest of brevity the description of example micro-disc modulator 700 provided below is focused on difference(s) between example micro-disc modulator 600 and example micro-disc modulator 700.

Compared with example micro-disc modulator 600, example micro-disc modulator 700 has reduced outer radius r1, from 1.6 μm to 1.3 μm, for each of the arc-shaped grooves while the inner radius r2 of each of the arc-shaped grooves remains unchanged at 1.0 μm. As shown in FIG. 7, the primary mode of resonance is not influenced significantly while the secondary mode of resonance becomes stronger when the outer radius r2 of each of the arc-shaped grooves is less than 1.5 μm.

Figure 8:
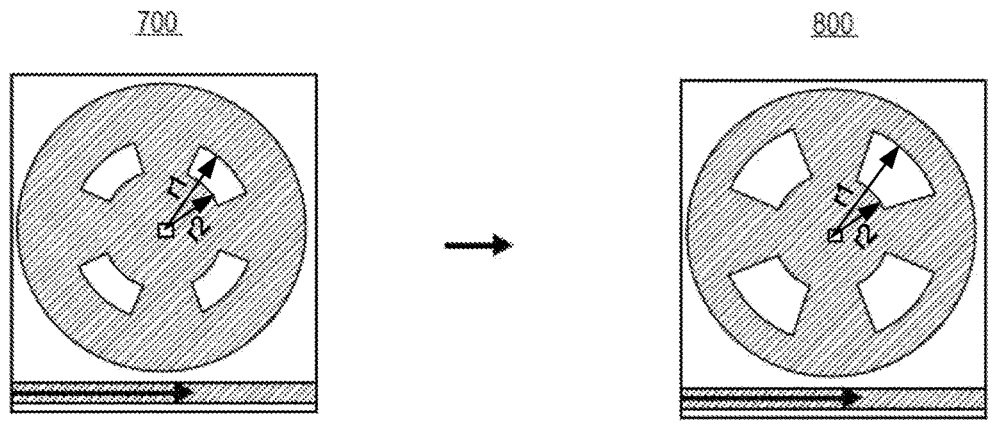
FIG. 8 is a diagram depicting mode profile simulation results of an example micro-disc modulator in accordance with yet another embodiment of the present disclosure.
Figure 8:
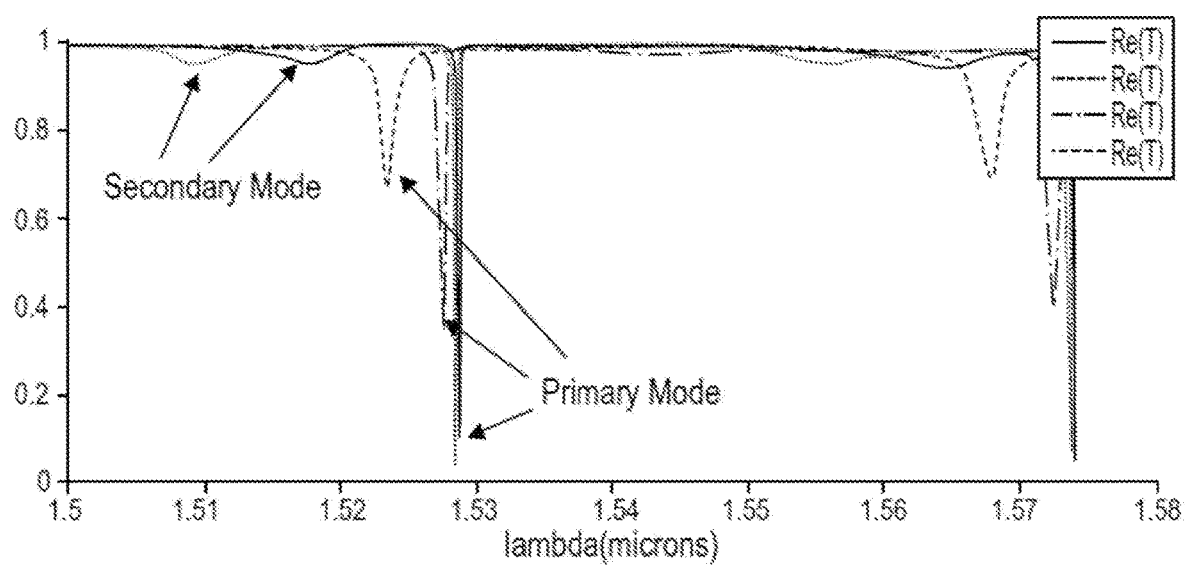

FIG. 8 is a diagram depicting mode profile simulation results of an example micro-disc modulator 800 in accordance with yet another embodiment of the present disclosure.

As most features of example micro-disc modulator 800 are similar or identical to those of example micro-disc modulator 700, in the interest of brevity the description of example micro-disc modulator 800 provided below is focused on difference(s) between example micro-disc modulator 700 and example micro-disc modulator 800.

Compared with example micro-disc modulator 700, example micro-disc modulator 800 has increased outer radius r1, from 1.6 μm to 1.9 μm, for each of the arc-shaped grooves while the inner radius r2 of each of the arc-shaped grooves remains unchanged at 1.0 μm. As shown in FIG. 8, the primary mode of resonance is not influenced when the outer radius r1 is in the range of 1.6 μm-1.7 μm approximately. The secondary mode of resonance is largely eliminated as r1 approaches 1.7 μm. The peak intensity and the Q factor of the primary mode of resonance starts to decrease when the outer radius r1 exceeds 1.8 μm.

Thus, a micro-disc modulator with vertical p-n junction, such as example micro-disc modulator 100, can achieve high modulation efficiency (80 pm/V in simulation, 160 pm/V measured in experiment) and large FSR (e.g., approximately 40 nm) which is essential for wavelength-division multiplexing (WDM) with more than ten channels. Moreover, higher order modes of resonance may be suppressed by adding arc-shaped grooves as with example micro-disc modulators 400, 500, 600, 700 and 800. Further exploration of the design space of the modulator is conducted to determine their impact for the suppression of higher order modes and quality factor Q. While the design of the arc-shaped grooves may vary, a few examples are presented above.

Figure 9:
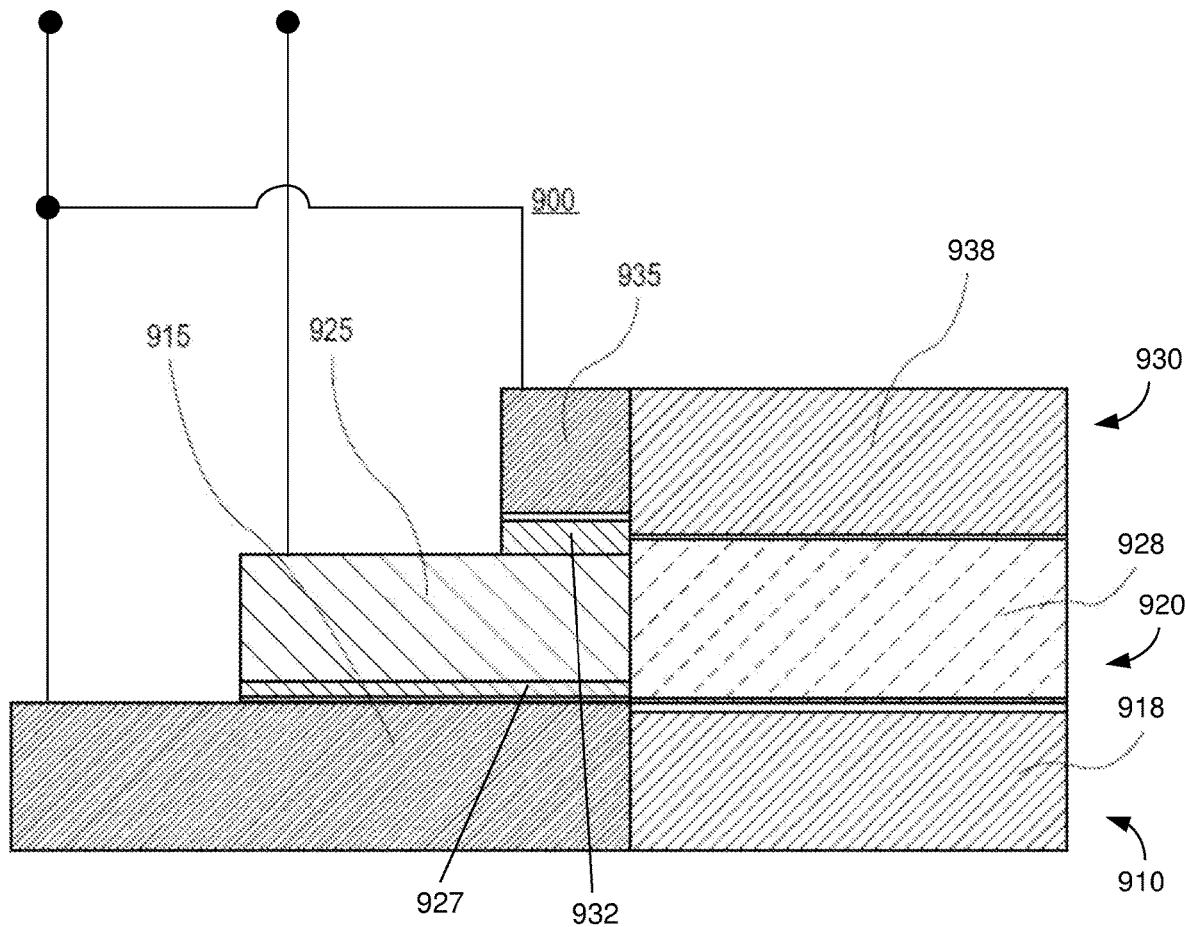
FIG. 9 is a diagram depicting a cross-sectional profile of an example vertical multi junction micro-disc modulator in accordance with an embodiment of the present disclosure.

FIG. 9 is a diagram depicting a cross-sectional profile of an example vertical multi junction micro-disc modulator 900 in accordance with an embodiment of the present disclosure.

Example micro-disc modulator 900 is part of a silicon photonic link (not shown) in which a silicon photonic structure containing example micro-disc modulator 900 is formed on top of a primary surface of a substrate. The substrate may be, for example, a silicon-based substrate such as a SOI substrate. As shown in FIG. 9, example micro-disc modulator 900 is a vertical multi junction micro-disc modulator and includes a first layer 910, a second layer 920 disposed on the first layer 910, and a third layer 930 disposed on the second layer 920. The first layer 910 and the third layer 930 are electrically connected by a low-resistance wire. Short between region 915 and region 935 may be external, e.g., wiring or metallization as shown in FIG. 9, or may be implemented by placing a heavily-doped region connecting the first layer 910 and the third layer 930. Doping level of each layer 910, 920 and 930 is controlled to achieve optimum performance of the modulator 900. The first layer 910 may include a first first-type region doped with first-type dopants. The second layer 920 may include a second-type region doped with second-type dopants and in contact with the first first-type region of the first layer 910. The third layer 930 may include a second first-type region doped with first-type dopants and in contact with the second-type region of the second layer 920. The first first-type region in the first layer 910 and the second-type region in the second layer 920 form a first p-n junction in which a direction of current flow is perpendicular to the primary surface of the SOI substrate on which example micro-disc modulator 900 is formed. The second-type region in the second layer 920 and the second first-type region in the third layer 930 form a second p-n junction in which a direction of current flow is perpendicular to the primary surface of the SOI substrate on which example micro-disc modulator 900 is formed.

As shown in FIG. 9, region 927 is a lightly-doped second-type region placed underneath the heavily-doped second-type region 925 which is placed to reduce junction capacitance of heavily-doped second-type region 925 and heavily-doped first-type region 915, and also suppress tunneling current when bias is applied. Similarly, region 932 is a lightly-doped first-type region placed underneath the heavily-doped first-type region 935.

The first layer 910 may be a first disc-shaped layer that includes a first central region 915 and a first peripheral region 918. As shown in FIG. 9, the first central region 915 may be doped with first-type dopants with controlled doping level and function as a first electrode. The first peripheral region 918 of the first layer 910 surrounds the first central region 915, and is the first first-type region of the first layer 910. The second layer 920 may be a second ring-shaped layer that includes a second central region 925 and a second peripheral region 928. As shown in FIG. 9, the second central region 925 of the second layer 920 may be optimally-doped with second-type dopants and function as a second electrode. The second central region 925 is shaped like a ring with the center thereof etched away. The second central region 925 is disposed on the first central region 915. The second peripheral region 928 of the second layer 920 surrounds the second central region 925, and is the second-type region of the second layer 920. The second peripheral region 928 is disposed on the first peripheral region 918. The third layer 930 may be a third ring-shaped layer that includes a third central region 935 and a third peripheral region 938. As shown in FIG. 9, the third central region 935 of the third layer 930 may be heavily-doped with first-type dopants and function as a third electrode. The third central region 935 is shaped like a ring with the center thereof etched away. The third central region 935 is disposed on the second central region 925. The third peripheral region 938 of the third layer 930 is the second first-type region of the third layer 930. The third peripheral region 938 is disposed on the second peripheral region 928.

Compared with a vertical p-n junction micro-disc modulator, such as example micro-disc modulator 100, example micro-disc modulator 900 can achieve approximately two times the modulation efficiency of example micro-disc modulator 100 e.g., 80 pico-meter/Volt for micro-disc modulator 100 and 155 pico-meter/Volt for micro-disc modulator 900. In other words, by doubling the modulation region the modulation efficiency can be doubled approximately. Moreover, higher order modes of resonance may be suppressed by adding arc-shaped grooves as with example micro-disc modulators 400, 500, 600, 700 and 800.

Figure 10A:
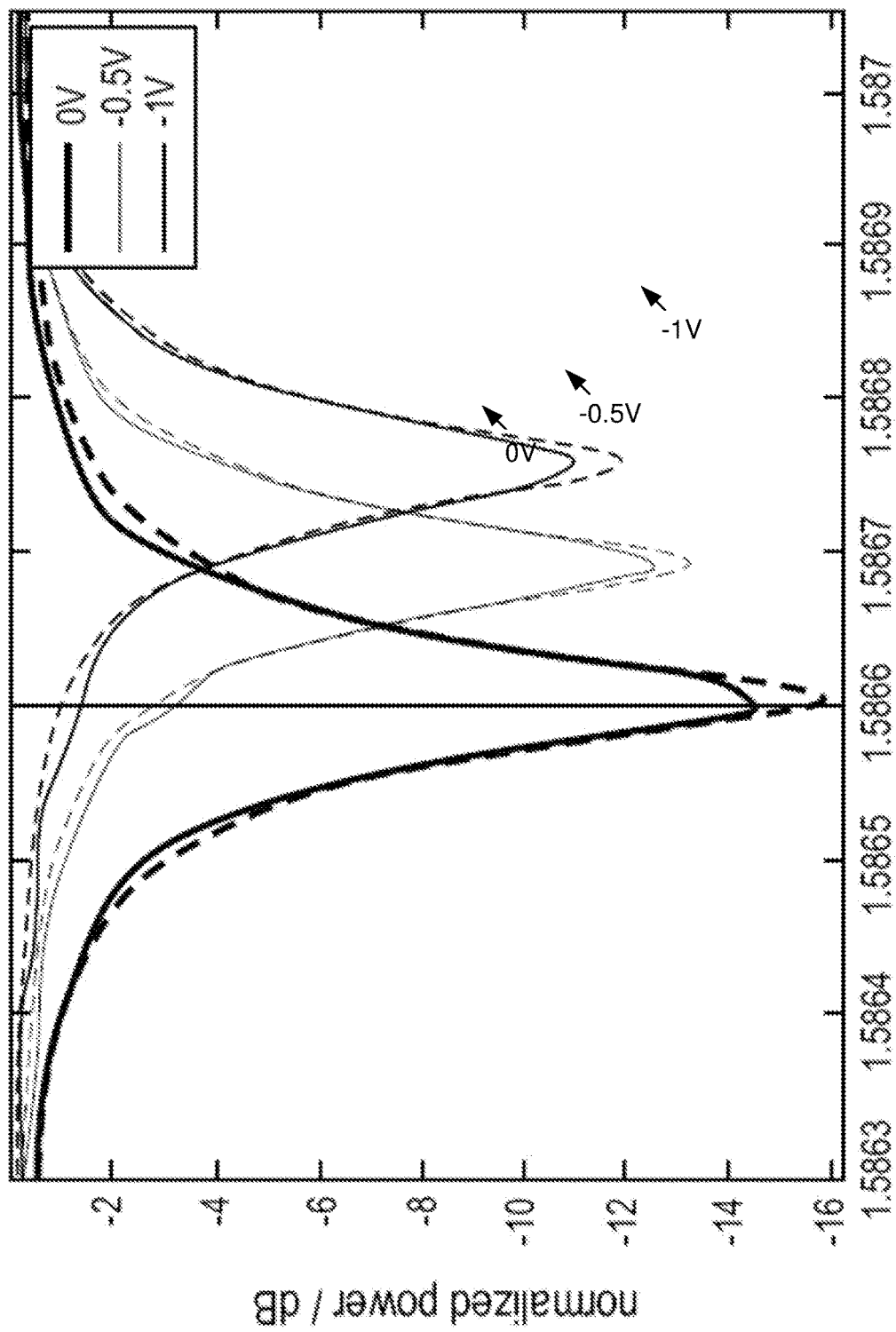
FIG. 10A is a diagram of simulated response of power transmission on a waveguide with an adjacent modulator in accordance with an embodiment of the present disclosure.

FIG. 10A is a diagram of simulated response of power transmission on a waveguide with an adjacent modulator (FIG. 1) in accordance with an embodiment of the present disclosure. In particular, FIG. 10A shows performance of an example vertical multi-junction micro-disc modulator of the present disclosure. Horizontal axis of the plot represents wavelength of radiation measured in micrometers, and vertical axis represents the power in waveguide. The dip in the line is due to power absorbed by the modulator at certain wavelength.

As shown in FIG. 10A, under an operating voltage ranging between 0V and 0.5V, the modulation efficiency measured by shift in the resonance by an applied bias across the junction of an example vertical multi junction micro-disc modulator of the present disclosure, such as example micro-disc modulator 900, is 155 pM/V with an extinction ratio of 13 dB. The high modulation efficiency results in low power detector circuits, improved optical link, as well as high operating speed.

Thus, the present disclosure provides a vertical multi junction micro-disc modulator with a single resonance frequency to simply high speed, low power photonic circuit design. The proposed design of modulator allows seamless integration with high performance CMOS technology with no special drivers required as the voltage required for modulator is less than 1V which is the operating voltage of high-speed transistors.

Figure 10B:
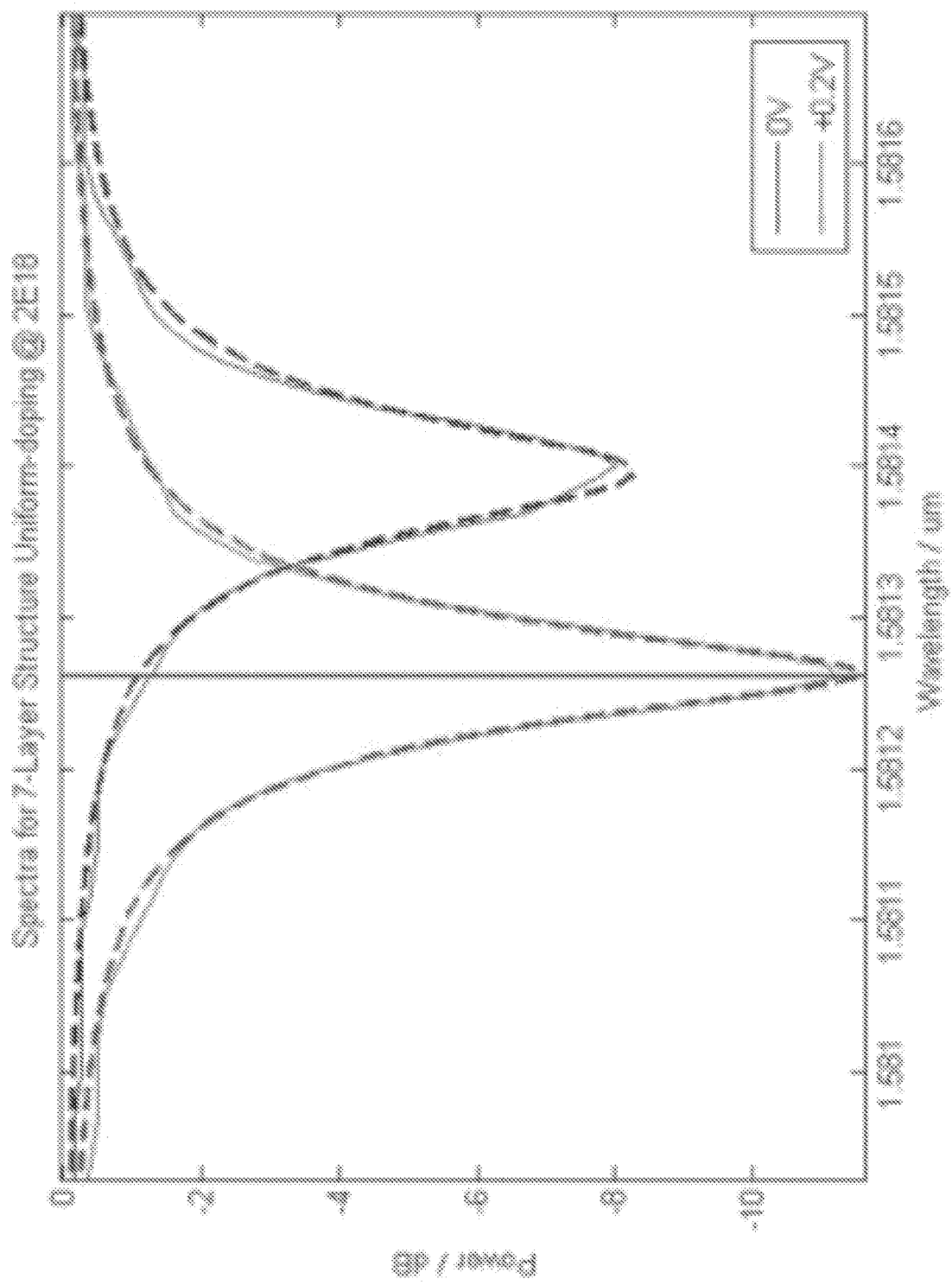
FIG. 10B is a diagram of simulated response of power transmission on a waveguide with a seven-layer multiple junction micro-disc modulator in accordance with an embodiment of the present disclosure.

FIG. 10B is a diagram of simulated response of power transmission on a waveguide with a seven-layer multiple junction micro-disc modulator in accordance with an embodiment of the present disclosure. The seven-layer multiple junction micro-disc modulator may be similar to modulator 170 shown in FIG. 2C. In the example shown in FIG. 10B, modulation efficiency of greater than 600 pM/V and high Q of 9500 may be achieved with doping level at $2 \times 10^{18}$ each layer.

Figure 11:
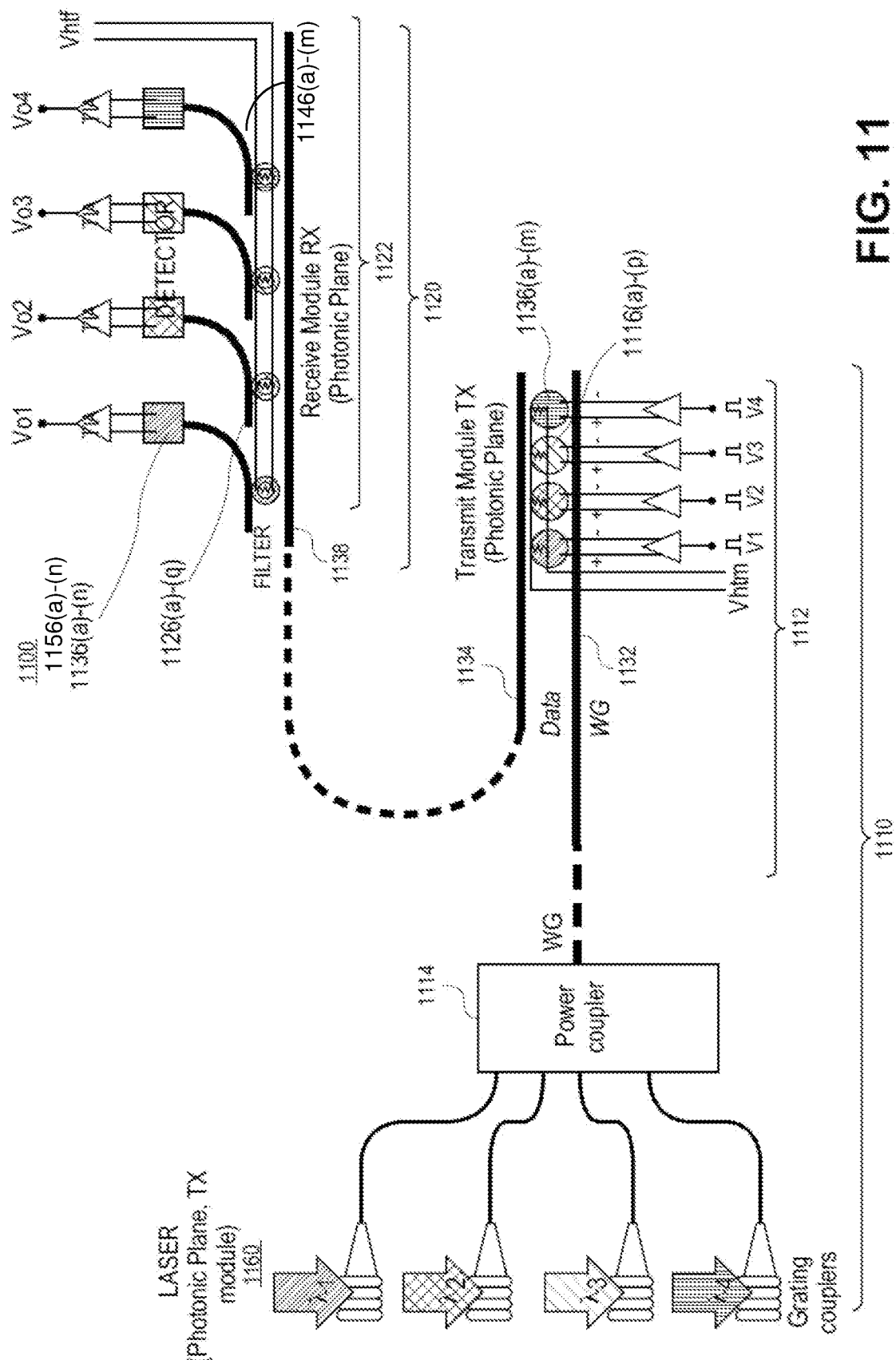
FIG. 11 is a diagram depicting an optical link implementing wavelength-division multiplexing (WDM) and modulator resonance control with heaters of an example optoelectronic communication apparatus in accordance with an embodiment of the present disclosure.

FIG. 11 is a diagram depicting an optical link with modulators 100 and 900 of FIGS. 1 and 9, respectively, and heaters of an example optoelectronic communication apparatus 1100 in accordance with an embodiment of the present disclosure. Due to various reasons, resonance frequency of a modulator may be offset by a certain amount from the desired value. In order to rectify this problem, local heaters are used to raise the temperature of modulators which increases the resonance wavelength.

Example optoelectronic communication apparatus 1100 includes a transmitter 1110 and a receiver 1120. The transmitter 1110 includes a first silicon photonic device 1112, a coupler 1114 and one or more first heaters 1116(a)-(p). The first silicon photonic device 1112 includes a first SOI substrate having a first primary surface and a first silicon photonic structure on the first primary surface of the first SOI substrate. The first silicon photonic structure includes a first silicon waveguide 1132, a second silicon waveguide 1134 and a plurality of first modulators 1136(a)-(n) disposed between and in proximity of the first silicon waveguide 1132 and the second silicon waveguide 1134. The coupler 1114 is optically coupled between a laser source 1160 and the first silicon waveguide 1132 to receive a beam of laser from the laser source 1160 and transmit the laser in the first silicon waveguide 1132. Each of the one or more first heaters 1116(a)-(p) correspond to and is configured to thermally tune a respective one of the plurality of first modulators 1136(a)-(m) such that the plurality of first modulators 1136(a)-(m) have a plurality of modulator resonance frequencies, that are different from each other, with respect to the beam of laser. Each of the plurality of second modulators 1136(a)-(m) may be an example vertical multi junction micro-disc modulator of the present disclosure, such as example micro-disc modulator 100, 130, 140, 170, 400, 500, 600, 700, 800 or 900.

In some embodiments, each of the one or more first heaters 1116(a)-(p) may be biased by a respective voltage. In some embodiments, the respective voltages of the one or more first heaters 1116(a)-(p) may be equal.

The receiver 1120 includes a second silicon photonic device 1122 and one or more second heaters 1126(a)-(q). The second silicon photonic device 1122 includes a second SOI substrate having a second primary surface and a second silicon photonic structure on the second primary surface of the second SOI substrate. The second silicon photonic structure includes a third silicon waveguide 1138, optically coupled to the second silicon waveguide 1134, and a plurality of second modulators 1146(a)-(m) disposed in proximity of the second silicon waveguide 1134. The second silicon photonic structure also includes a plurality of photodetectors 1156(a)-(n) optically coupled to the plurality of second modulators 1146(a)-(m). Each of the one or more second heaters 1126(a)-(q) corresponds to and is configured to thermally tune a respective one of the plurality of second modulators 1146(a)-(m) such that the plurality of second modulators 1146(a)-(m) have a plurality of modulator resonance frequencies, that are different from each other, with respect to the beam of laser. Each of the plurality of second modulators 1146(a)-(m) may be an example vertical multi junction micro-disc modulator of the present disclosure, such as example micro-disc modulator 100, 130, 140, 170, 400, 500, 600, 700, 800 or 900.

In some embodiments, each of the one or more second heaters 1126(a)-(q) may be biased by a respective voltage. In some embodiments, the respective voltages of the one or more second heaters may be equal.

Figure 12:
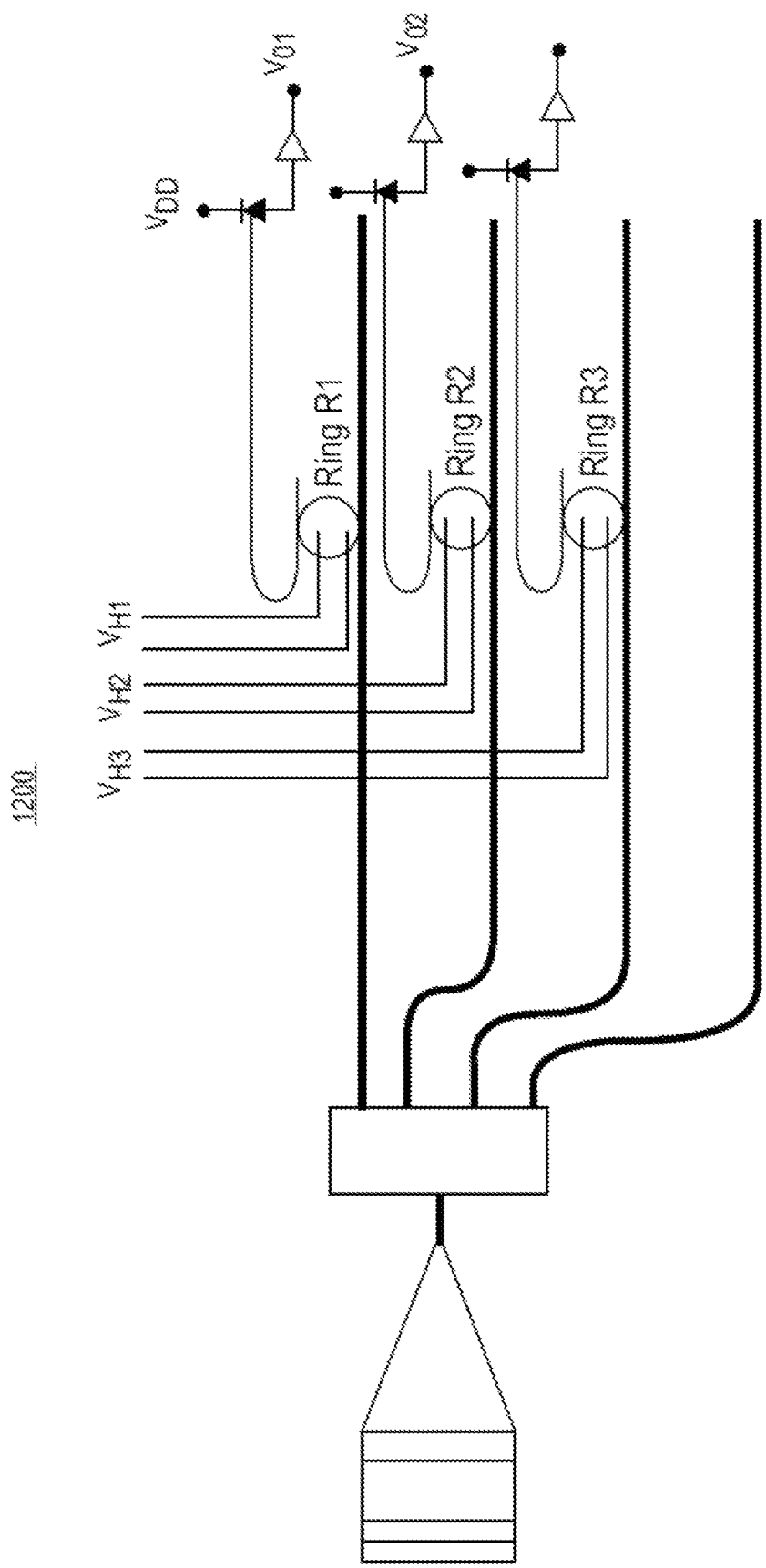
FIG. 12 is a schematic diagram of an example modulator tuning circuit for an example optoelectronic communication apparatus in accordance with an embodiment of the present disclosure.

FIG. 12 is a schematic diagram of an example modulator tuning circuit 1200 for example optoelectronic communication apparatus 1100 in accordance with an embodiment of the present disclosure.

An assumption taken in the setup of example modulator tuning circuit 1200 is that response of rings located in close proximity varies uniformly with temperature. Under this assumption, three micro-disc modulators with equally separated resonance wavelengths $\lambda 1$, $\lambda 2$ and $\lambda 3$ driven by a laser with wavelength $\lambda 2$. An external power source is used to control heater bias of a number of heaters (e.g., the one or more first heaters 1116(a)-(p) and/or the one or more second heaters 1126(a)-(q)) such that the bias voltages are the same, e.g., VH=VH1=VH2=VH3, where VH1 is the bias voltage of first heater 1116(a) or second heater 1126(a), VH2 is the bias voltage of first heater 1116(b) or second heater 1126(b), VH3 is the bias voltage of first heater 1116(c) or second heater 1126(c), etc. Drop port output delivered to the plurality of photodetectorss 1156(a)-(n) generates voltages Vo1, Vo2, Vo3, etc.

Figure 13:
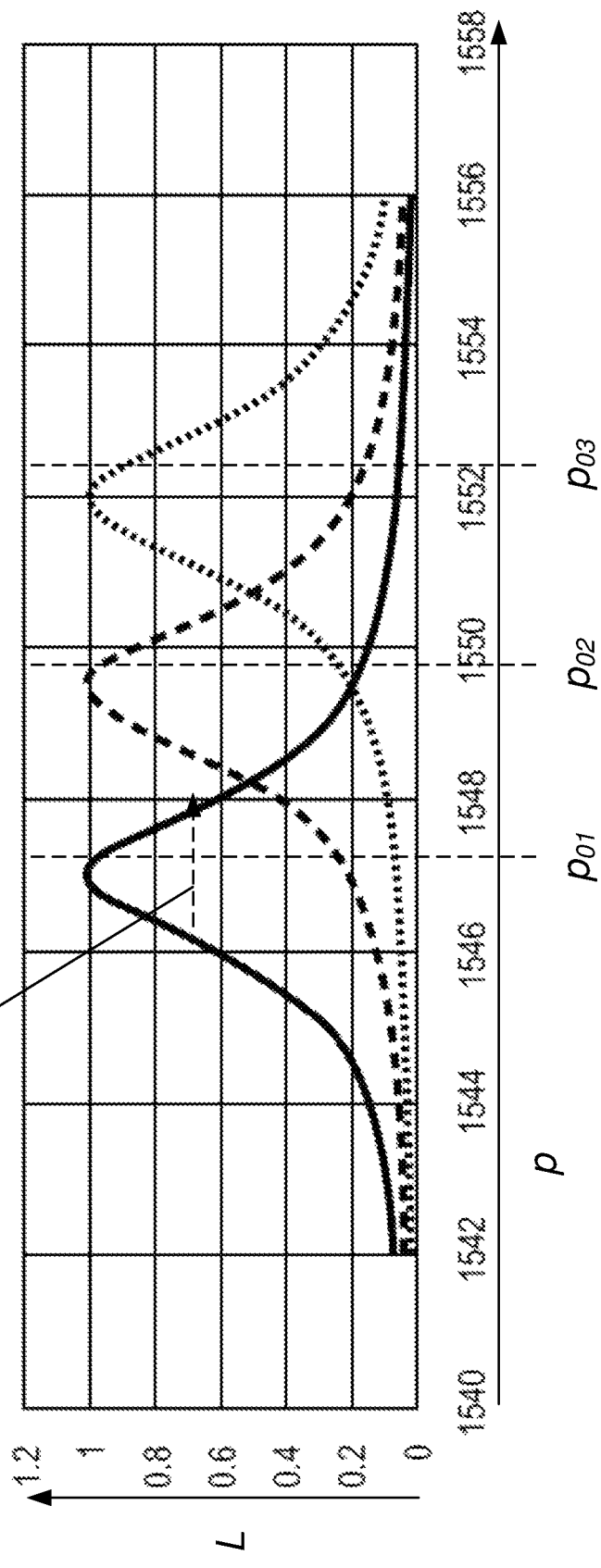
FIG. 13 is a diagram showing simulated response of modulators in an example modulator tuning circuit in accordance with an embodiment of the present disclosure.

FIG. 13 is a diagram showing simulated response of modulators in example modulator tuning circuit 1200 in accordance with an embodiment of the present disclosure.

FIG. 13 shows normalized drop port intensity versus wavelength. The Lorentzian line is defined by the following expression:

$$L = \frac{1}{\tau + v^2}, \text{ where } X \ldots \frac{p^o - p}{w/2}.$$

Here, $\rho^o$ denotes the resonance wavelength which varies for each modulator. The plot shows variation of L with wavelength. As shown in FIG. 13, all three modulators have the same bandwidth w.

Figure 14A:
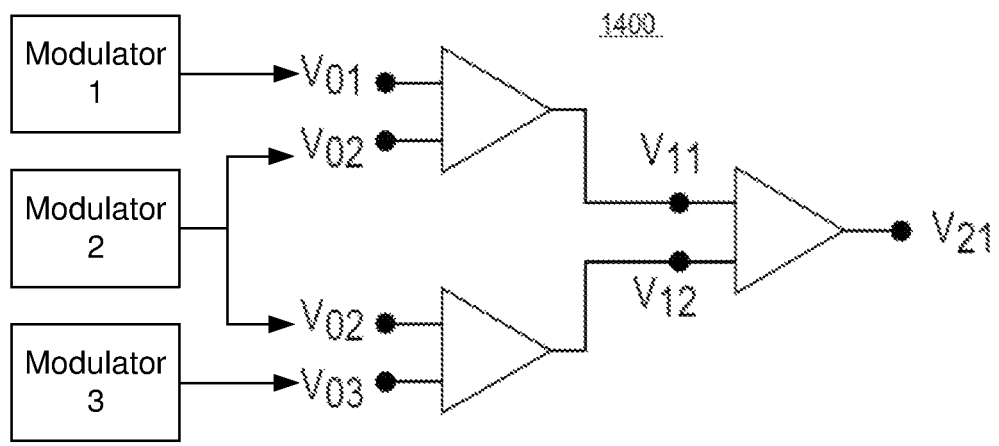
FIG. 14A is a diagram showing a schematic diagram of an example amplifier circuit for photodiode output in accordance with an embodiment of the present disclosure.
Figure 14B:
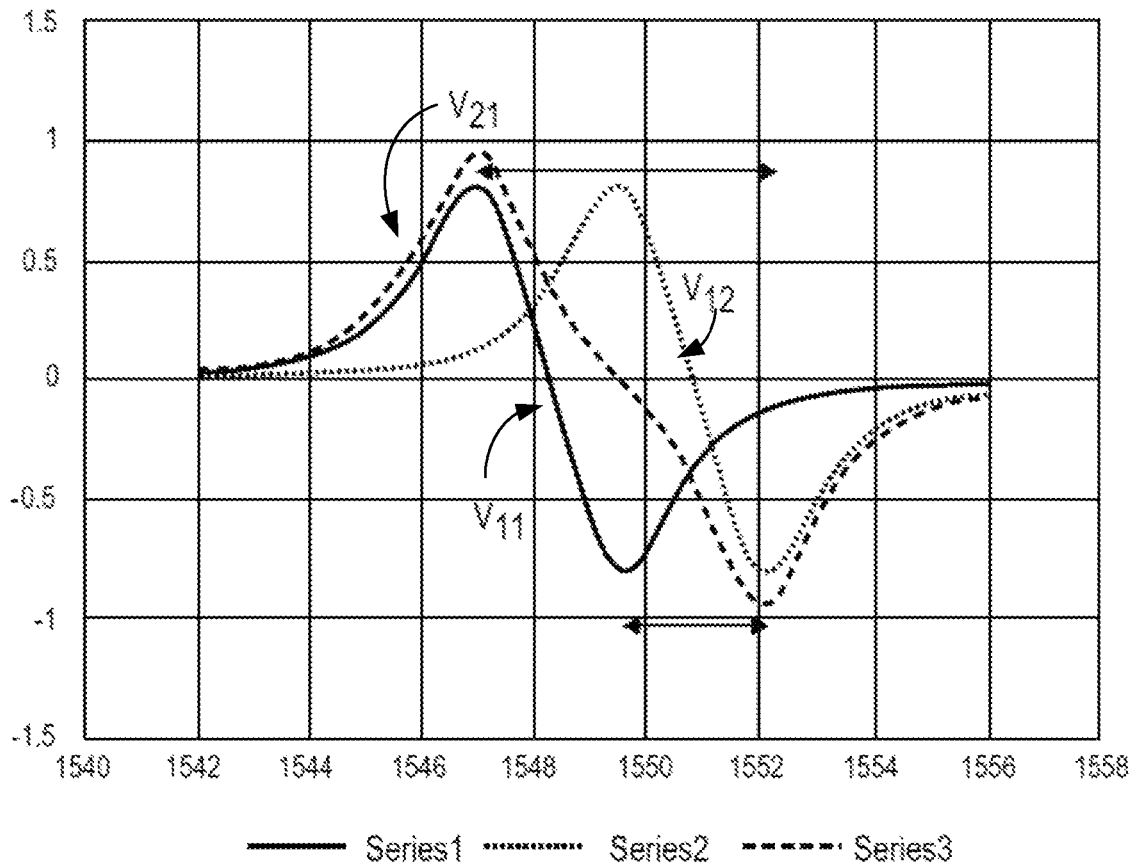
FIG. 14B is a diagram showing a chart showing response of first and second stage amplifiers in an example modulator tuning circuit in accordance with an embodiment of the present disclosure.

FIGS. 14A and 14B show a schematic diagram of an example amplifier circuit 1400 for photodiode output and a chart showing response of first and second stage amplifiers in example modulator tuning circuit 1200, respectively, in accordance with an embodiment of the present disclosure. In particular, FIG. 14A shows example amplifier circuit 1400, and FIG. 14B shows response of first and second stage amplifiers. As shown in FIG. 14A, the inputs of first stage amplifiers are connected to the outputs of modulators.

Referring to FIGS. 14A and 14B, output voltage $V_{0,n}$ is generated by ramping heater bias. A control voltage at the heaters (e.g., the one or more first heaters 1116(a)-(p) and/or the one or more second heaters 1126(a)-(q)) is adjusted to deliver zero buffer output voltage $V_{21}$=0V. Using three-buffer arrangement as shown in FIG. 14A, the range of resonance wavelength misalignment is doubled. As shown in FIG. 14B, the dynamic range of output of the second stage is twice the range of the first stage.

Thus, in FIG. 11-FIG. 14, a novel optoelectronic communication apparatus having an optical link with heaters is provided. The proposed design utilizes heaters for thermal tuning of modulators (e.g., micro-disc modulators in accordance with the present disclosure or other suitable modulators) to reduce the required footprint and power consumption, thus providing an area and power-efficient solution.

Figure 15A:
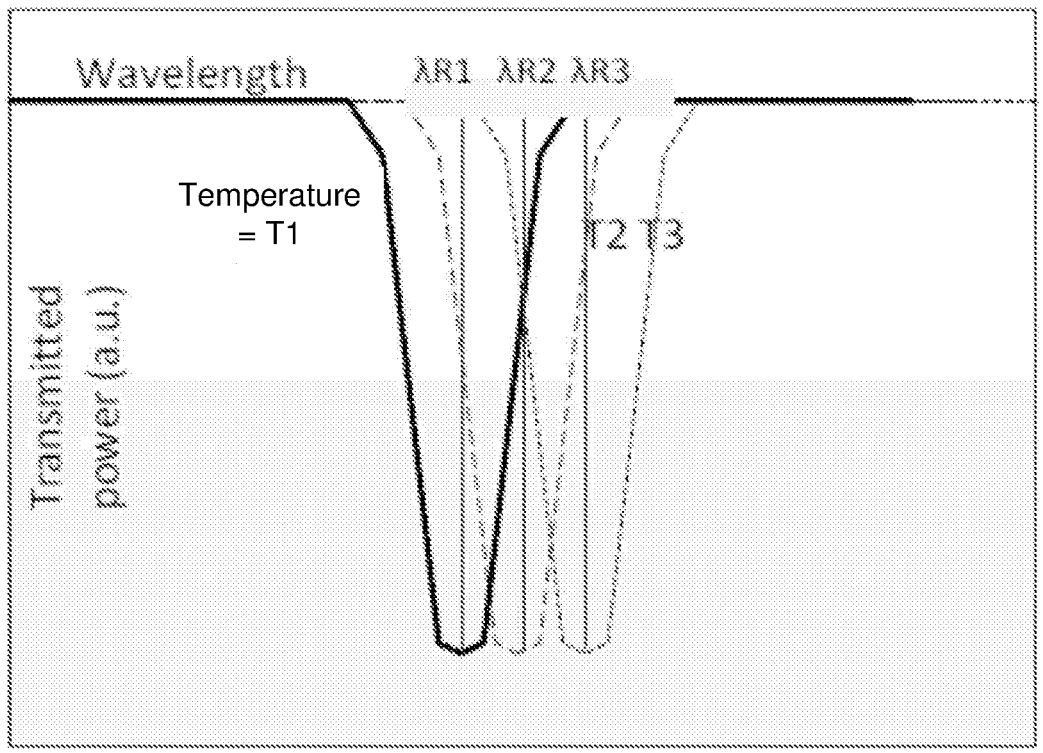
FIG. 15A is a diagram of transmitted energy measured at the end of a through-port of a photonic link at various temperatures in accordance with an embodiment of the present disclosure.
Figure 15B:
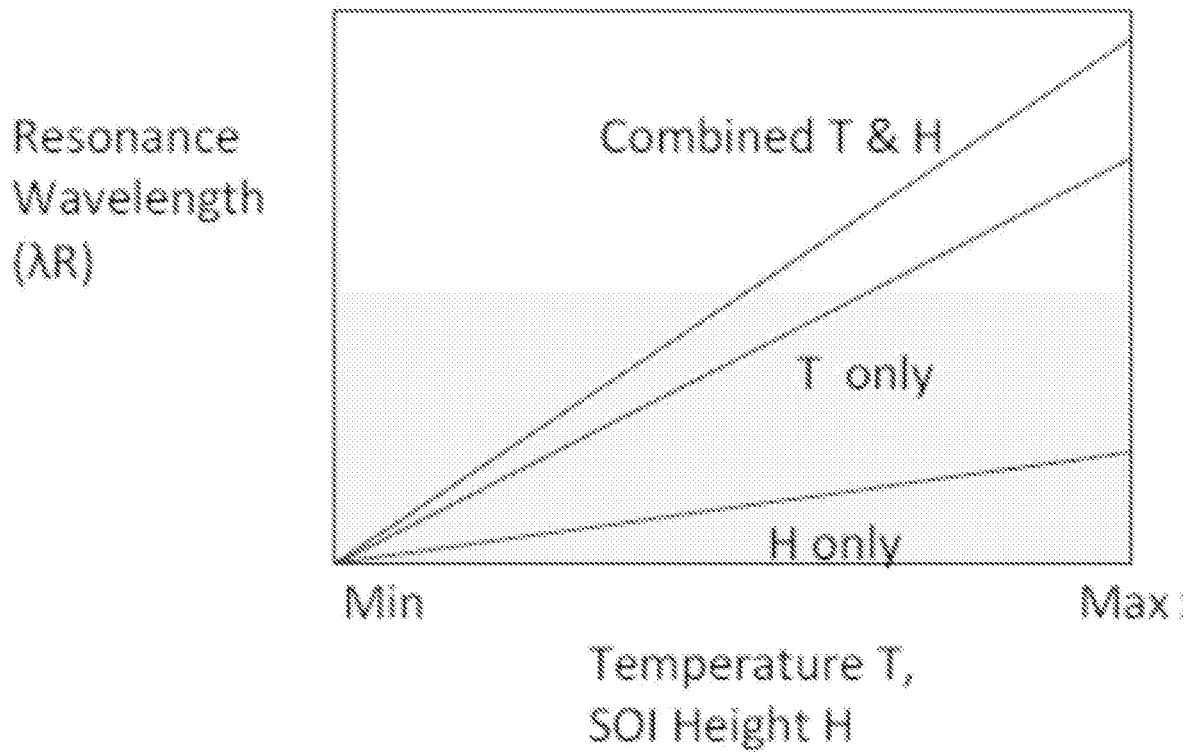
FIG. 15B is a diagram of effects of variation in thickness of SOI and/or temperature on resonance wavelength in accordance with an embodiment of the present disclosure.

FIG. 15A is a diagram of transmitted energy measured at the end of a through-port of a photonic link at various temperatures in accordance with an embodiment of the present disclosure. FIG. 15B is a diagram of effects of variation in thickness of SOI and/or temperature on resonance wavelength in accordance with an embodiment of the present disclosure.

As shown in FIG. 15A, as the temperature increases, the resonance takes place at increasing wavelength. The shift in resonance is shown to be closely approximated by a linear dependence upon temperature, as given by the following expression: $\lambda R(T)=\lambda R_o, +K*\Delta T$, where $\lambda R(T)$ denotes temperature-dependent resonance of a modulator, $\lambda R_o$ denotes the resonance at a given temperature and process condition, $\Delta T$ denotes the temperature range to be supported, and K denotes a linear proportionality constant for variation in temperature. The modulator resonance $\lambda R$ varies with temperature and process, and is expressed by the following expressions: $\lambda R$=f(Temperature, Process) and $\lambda R=\lambda R_o+ K*\Delta T+L*\Delta H$, where L denotes a linear proportionality constant for variation in process, and $\Delta H$ denotes the process range to be supported. Height of the SOI layer (H) is considered as the main reason for variation of resonance. For illustrative purpose, example values of some of the parameters in the above expressions are as follows: $\Delta T$=60° C., $\Delta H$=4 nm, K=0.1 nm/C and L=0.8 nm/nm. Thus, in the example, expected change in $\lambda R$ over the range of process and temperature variation is calculated as follows: $\lambda R=\lambda R_o+ 0.1*60+0.8*4=\lambda R_o+9.2$ nm.

It is noteworthy that in the above example the expected variation in $\lambda R$ is 9.2 nm. If this variation was to be managed by varying the temperature of the micro-disc modulator only, it would result in variation in temperature of >90° C., which will make this design power inefficient. Hence, an alternate method is proposed herein to reduce the power dissipation required to control the resonance wavelength $\lambda R$ of the ring(s) of a micro-disc modulator of the present disclosure.

The proposed method is based on designing multiple different micro-disc modulators with gradually increased $\lambda R$ by changing the disc radius to cover the whole temperature and process range. In the following example, four micro-disc modulators are used for providing temperature compensation. The radii of these four micro-disc modulators are varied to enable resonance at the same wavelength ($\lambda R_o$) at temperatures $T_1$, $T_2$, $T_3$ and $T_4$ and at different process conditions. These four temperature ranges are arrived at by splitting the temperature range in four parts as follows:

$T_{min}$=10° C.,
$T_{max}$=70° C.,
$T_{max}-T_{min}$=60° C.,
$T_1=T_{min}+60°$ C./4=25° C.,
$T_2=T_1+60°$ C./4=40° C.,
$T_3=T_2+60°$ C./4=55° C., and
$T_4=T_3+60°$ C./4=$T_{max}$.

Referring to FIG. 15B, variation in thickness of the SOI layer (H) also has the effect of increasing $\lambda R$ with temperature linearly.

The process and temperature variations are linear and additive, and they can be described in the expression for $\lambda R$ as a function of change in T and H as:

$$\lambda R = \lambda R_o + K^* \Delta T + L^* \Delta H;$$

It is also shown in FIG. 15B. In order to insure that the resonance of the micro-disc modulators remain within the range of λRo and λR1, four discs are designed such that their resonance is within the range λRo and λR1 while temperature varies over the range Tmin and Tmax. This is accomplished by designing four discs D1, D2, D3, and D4 by changing their radius and other dimensional attributes.

$$\lambda R(T \min, H \min) = \lambda R_o; \lambda R(T \min + Trng/4, H \min + Hrng/4) = \lambda R_1 \quad \text{Disc D1:}$$

$$\lambda R(T \min + Trng/4, H \min + Hrng/4) = \lambda R_o; \lambda R(T \min + 2^*Trng/4, H \min + 2^*Hrng/4) = \lambda R_1 \quad \text{Disc D2:}$$

$$\lambda R(T \min + 2^*Trng/4, H \min + 2^*Hrng/4) = \lambda R_o; \lambda R(T \min + 3^*Trng/4, H \min + 3^*Hrng/4) = \lambda R_1 \quad \text{Disc D3:}$$

$$\lambda R(T \min + 2^*Trng/4, H \min + 2^*Hrng/4) = \lambda R_o; \lambda R(T \min + 3^*Trng/4, H \min + 3^*Hrng/4) = \lambda R_1 \quad \text{Disc D4:}$$

The dimension (primarily the radius) of the discs is decreased successively such that with gradually increasing temperature, their resonance wavelength remains unchanged within the bounds given by λRo and λR1. The dual effects of temperature and process, when combined, modify the range resonance of each disc given by the wavelengths λR1, λR2, λR3 and λR4 as described below.

$$\lambda R_1 = \lambda R_o + K^* T_{range}/4 + L^* H_{range}/4$$

$$\lambda R_2 = \lambda R_1 + K^* T_{range}/4 + L^* H_{range}/4$$

$$\lambda R_3 = \lambda R_2 + K^* T_{range}/4 + L^* H_{range}/4$$

$$\lambda R_4 = \lambda R_3 + K^* T_{range}/4 + L^* H_{range}/4$$

Based on the above expressions, the range of correction for each disc is only $\frac{1}{4}^{th}$ of the complete range. In this instance, operation of each micro-disc needs to be corrected for only 15° C. (which is 60° C./4) and variation in SOI thickness of 1 nm (which is 4 nm/4) only. Each micro-disc is designed to operate at minimum temperature and SOI thickness without any change in external stimulus. Ring R1 operates between wavelength λR$_o$, and λR$_1$, where λR$_o$, is the resonant wavelength at zero external bias and λR$_1$ is the resonance at temperature TN which is expressed as follows: $\lambda R_o$, $+K^* T_{range}/4 + L^* H_{range}/4 = \lambda R_o + K^*(TN-T_0)/4$, or alternatively, $TN-T_0 = T_{range} + L^* H_{range}/(K^* T_{range})$ or $TN = T_{max} + L^* H_{range}/(K^* T_{range})$, where $T_{range} = T_{max} - T_{min}$. Thus, by varying the temperature of the micro-disc locally, the error in LR due to change in ambient temperature and SOI thickness is corrected.

This is implemented by designing the optical link with four micro-disc modulators with resonance wavelength corresponding to the expressions above regarding λR$_1$, λR$_2$, λR$_3$ and λR$_4$.

Figure 16:
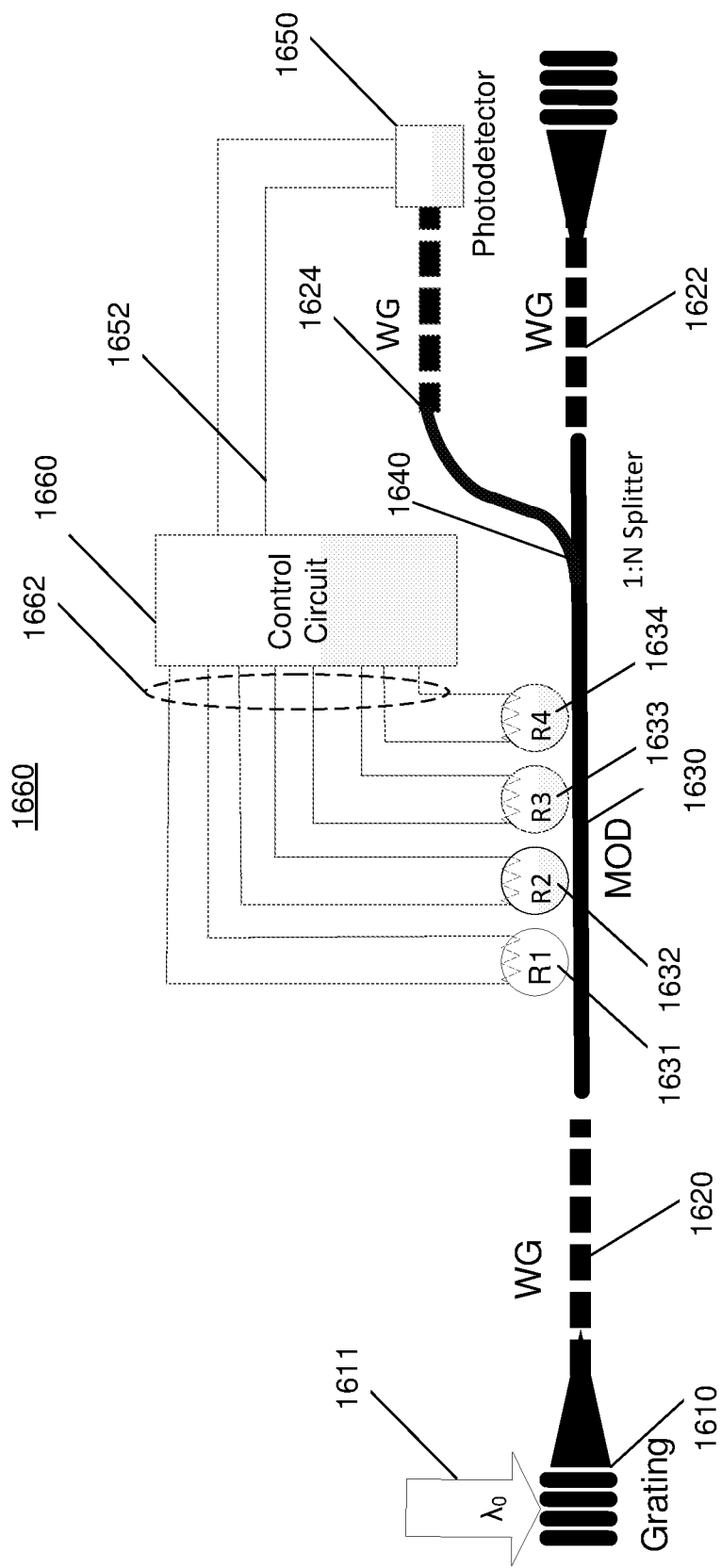
FIG. 16 is a diagram depicting an example optical link with heaters in accordance with an embodiment of the present disclosure.

FIG. 16 is a diagram depicting an example optical link 1600 with heaters in accordance with an embodiment of the present disclosure. The photonic link 1600 begins with a laser 1611 coupled to grating couplers 1610. The wavelength of the laser 1611 is calibrated to deliver the desired wavelength radiation λ$_o$. Laser radiation is carried to a waveguide 1620 which has multiple micro-discs modulators 1631, 1632, 1633, 1634 designed with appropriate dimensions to cover respective temperature range. These micro-disc modulators 1631, 1632, 1633, 1634 are designed with varying resonance wavelength at room temperature and nominal process conditions such that they (micro-disc modulators 1631, 1632m 1633 and 1634) resonate at wavelength λR$_1$ at temperature ((Tmin+Trng/4), (Tmin+2*Trng/4), (Tmin+3*Trng/4) and Tmax), respectively, and at λR$_0$ at (Tmin, (Tmin+Trng/4), (Tmin+2*Trng/4), (Tmin+3*Trng/4)), respectively. Since only one micro-disc of a given modulator 1630 in the optical link is designed to be active at a given operating point, having multiple micro-disc modulators results in negligible impact on the link budget. The overlap of the resonance from adjoining discs is avoided by designing their resonance wavelengths to be different. Each micro-disc modulators 1631, 1632, 1633, 1634 has a heater R1, R2, R3, R4, respectively, associated with it in order to locally heat it and raise its temperature. Radiation propagates in the waveguide 1620 past the micro-rings and reaches a splitter 1640. A small fraction of the power is split from the waveguide and transferred to waveguide 1624 and finally, is incident on the photodetectors 1650. Remaining radiation carrying most of the power continues on to waveguide 1622. Output of the photodetectors 1650 is connected to a control circuit 1660 by a set of wires 1652. This control circuit provides the control signal to the heaters R1, R2, R3, R4 and bias to the modulator by a network 1662.

Calibration of the micro-disc is carried out in the manner described below where the optical link 1600 is designed as that shown in FIG. 16. Input signal from the grating coupler 1610 propagates through the waveguides 1620 and a splitter 1640 transfers a small fraction of energy (1/N, where N is greater than 20) to a waveguide 1624 incident on a photodetectors 1650. Output of the photodetectors 1650 is an electrical current (Icn) proportional to the intensity of the incident radiation on the photodetectors 1650. Under certain conditions, one of the micro-disc modulators resonates with the waveguide, and the radiation from the waveguide is transferred to the resonating micro-disc modulator. The intensity of radiation reaching the splitter 1640 and the photodetectors 1650 is reduced. The photodetectors output Icn is used as a control signal for control circuit 1660 which is used to tune the micro-disc resonance. The algorithm used to tune the micro-disc resonance is presented in FIG. 17.

Figure 17:
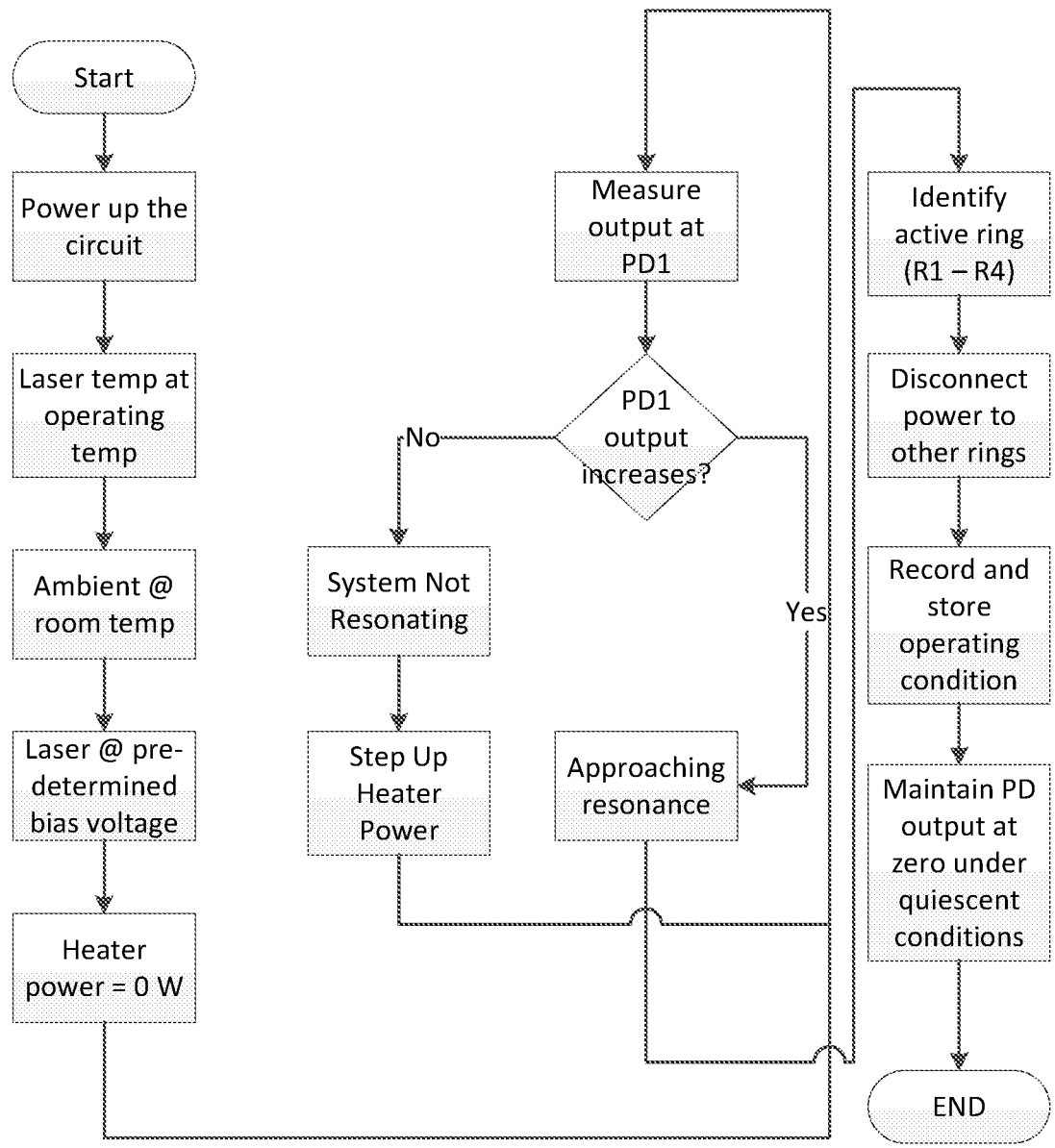
FIG. 17 is a flowchart diagram of an example process of calibrating an example optical link in accordance with an embodiment of the present disclosure.

FIG. 17 is a flowchart diagram of an example process of calibrating an example optical link in accordance with an embodiment of the present disclosure. Referring to FIGS. 16 and 17, the example calibration method starts by powering up the photonic link 1600 including the control circuit 1660 as shown in FIG. 16. The laser 1611 is powered up to provide radiation at wavelength λ$_0$. The ambient temperature is at room temperature in the current example. The power of heaters is at 0 W, implying that there is no power delivered by the control circuit 1660 to the heating elements R1, R2, R3, R4 associated with each of the micro-disc modulators 1631-1634. The radiation launched in the waveguide 1620 is modulated by the micro-disc modulators 1631-1634, split by the splitter 1640 and is measured by the photodetector 1650. Output of the photodetector 1650 is measured by the control circuit 1660 and recorded as Icn0. The example calibration method then causes the control circuit 1660 to increases the temperature of heaters R1, R2, R3, R4 in all four micro-disc modulators 1631, 1632, 1633, 1634 simultaneously and monitor the output of photodetector 1650. It is assumed that in the beginning, none of the four modulators 1631, 1632, 1633, 1634 are tuned to waveguide at the wavelength λ0. In this condition, no radiation is absorbed by the modulators 1631, 1632, 1633, 1634 and the output of the photodetectors 1650 is at maximum. Next, the temperature of the heaters R1, R2, R3, R4 is increased gradually and photodetector 1650 output is monitored regularly. If the photodetectors 1650 output has not decreased, it is determined that the system is not resonating and, in response, heater power is increased further. If, however, the photodetectors 1650 output has decreased, it is determined that the system is approaching resonance. Power at the heaters R1, R2, R3, R4 is increased till the resonance wavelength of the four micro-disc modulators 1631, 1632, 1633, 1634 increases and, eventually, resonance condition at one of the micro-disc modulators 1631, 1632, 1633, 1634 is satisfied which causes the radiation from the waveguide 1620 to be absorbed by one of the micro-disc modulators 1631, 1632, 1633, 1634, resulting in reduction in intensity of radiation reaching the photodetectors 1650. This is sensed by the control circuit 1660. The heater output is increased till a minimum is observed in the intensity of radiation at the photo detector 1650.

Next, the active micro-disc modulator is identified since any one of the four micro-disc modulators can be resonating. This identification is carried out by the following steps. First, the control circuit 1660 biases the heater to enable minimum power delivered to the photodetector 1650 which implies that one of the micro-disc modulators is in resonance. Next, the control circuit 1660 applies a pre-determined control bias across the P-N junction in first micro-disc modulator 1631 exclusively. Bias across other micro-disc modulators is kept at zero. Once again, output of the photodetectors 1650 is measured. Change in output of the micro-disc modulator indicates that this particular micro-disc modulator is in resonance and the resonance has been shifted by the applied voltage. Thus, this particular micro-disc modulator is identified as the resonant micro-disc modulator. Power to the other micro-disc modulators is disconnected since only one micro-disc modulator is designed to be resonating at a given temperature. The operating condition at this point is recorded and stored in memory. This method may be repeated for each of the photodetectorss.

The operating conditions are monitored on a regular time interval and the micro-disc modulators 1631, 1632, 1633, 1634 are continuously adjusted for resonance. This accounts for change in temperature of photonic link 1600 due to any conditions.

In view of the above, features of various embodiments of the present disclosure are highlighted below.

In one aspect, a silicon photonic device may include a silicon-on-insulator (SOI) substrate having a first primary surface and a silicon photonic structure on the first primary surface of the SOI substrate. The silicon photonic structure may include a silicon waveguide and a micro-disc modulator adjacent to the silicon waveguide. The micro-disc modulator may have a top surface substantially parallel to the first primary surface of the SOI substrate. The top surface may include one or more discontinuities therein.

In some embodiments, the one or more discontinuities may be disposed at locations that coincide with locations of a secondary or higher mode of resonance in the micro-disc modulator corresponding to a predefined wavelength.

In some embodiments, the locations of the one or more discontinuities may correspond to locations of peaks of field intensity of the secondary or higher mode of resonance in the micro-disc modulator.

In some embodiments, the one or more discontinuities may include one or more grooves etched into the top surface of the micro-disc modulator. In some embodiments, the one or more grooves comprise at least four arc-shaped grooves of equal dimensions each subtending an angle of 45 degrees at a center of the micro-disc modulator and disposed approximately 45 degrees apart around a circle centered at a center point of the top surface of the micro-disc modulator.

In some embodiments, an outer radius of each of the arc-shaped grooves may be within a predefined range.

In some embodiments, the micro-disc modulator may include a first first-type region doped with first-type dopants. The micro-disc modulator may also include a second-type region doped with second-type dopants and in contact with the first first-type region. The first first-type region and the second-type region may form a first p-n junction in which a direction of current flow is perpendicular to the first primary surface of the SOI substrate. In some embodiments, the micro-disc modulator may include a first disc-shaped layer and a second ring-shaped layer. The first disc-shaped layer may include a first central region and a first peripheral region. The first central region may include a first electrode, and the first peripheral region may include the first first-type region. The second ring-shaped layer may be disposed on the first disc-shaped layer, and may include a second central region and a second peripheral region. The second central region may include a second electrode, and the second peripheral region may include the second-type region. A center of the second central region may be etched away to form a hole to provide an electrical contact to the first first-type region.

In some embodiments, the micro-disc modulator may further include a second first-type region doped with first-type dopants and in contact with the second-type region. The second-type region may be disposed on the first first-type region, and the second first-type region may be disposed on the second-type region. The second-type region and the second first-type region may form a second p-n junction in which a direction of current flow is perpendicular to the first primary surface of the SOI substrate. In some embodiments, the micro-disc modulator may include a first disc-shaped layer, a second ring-shaped layer and a third ring-shaped layer. The first disc-shaped layer may include a first central region and a first peripheral region. The first central region may include a first electrode, and the first peripheral region may include the first first-type region which is photonically active. The second ring-shaped layer may be disposed on the first disc-shaped layer, and may include a second central region and a second peripheral region. The second central region may include a second electrode, and the second peripheral region may include the second-type region which is photonically active. The third ring-shaped layer may be disposed on the second ring-shaped layer, and may include a third central region and a third peripheral region. The third central region may include a third electrode, and the third peripheral region may include the second first-type region.

In some embodiments, the micro-disc modulator may further include at least one additional ring-shaped layer disposed on the third ring-shaped layer such that the micro-disc modulator comprises three or more ring-shaped layers disposed over the first disc-shaped layer with the first disc-shaped layer and the three or more ring-shaped layers alternatively doped with first-type dopants and second-type dopants.

In another aspect, a silicon photonic device may include a SOI substrate having a first primary surface and a silicon photonic structure on the first primary surface of the SOI substrate. The silicon photonic structure may include a silicon waveguide and a micro-disc modulator adjacent to the silicon waveguide. The micro-disc modulator may include a first layer having a first first-type region doped with first-type dopants and a second layer disposed on the first layer. The second layer may have a second-type region doped with second-type dopants and in contact with the first first-type region. The first first-type region and the second-type region may form a first p-n junction in which a direction of current flow is perpendicular to the first primary surface of the SOI substrate.

In some embodiments, the first layer may include a first disc-shaped layer that includes a first central region and a first peripheral region with the first central region being a first electrode and the first peripheral region being the first first-type region. The second layer may include a second ring-shaped layer that includes a second central region and a second peripheral region with the second central region being a second electrode and the second peripheral region being the second-type region.

In some embodiments, the micro-disc modulator may further include a third layer having a second first-type region doped with first-type dopants and in contact with the second-type region of the second layer. The second-type region may be disposed on the first first-type region. The second first-type region may be disposed on the second-type region. The second-type region and the second first-type region may form a second p-n junction in which a direction of current flow is perpendicular to the first primary surface of the SOI substrate.

In some embodiments, the first layer may include a first disc-shaped layer that includes a first central region and a first peripheral region with the first central region being a first electrode and the first peripheral region being the first first-type region. The second layer may include a second ring-shaped layer that includes a second central region and a second peripheral region with the second central region being a second electrode and the second peripheral region being the second-type region. The third layer may include a third ring-shaped layer that includes a third central region and a third peripheral region with the third central region being a third electrode and the third peripheral region being the second first-type region.

In some embodiments, the micro-disc modulator may further include at least one additional ring-shaped layer disposed on the third ring-shaped layer such that the micro-disc modulator comprises three or more ring-shaped layers disposed over the first disc-shaped layer with the first disc-shaped layer and the three or more ring-shaped layers alternatively doped with first-type dopants and second-type dopants.

In some embodiments, the micro-disc modulator may further include a top surface substantially parallel to the first primary surface of the SOI substrate. The top surface may include one or more discontinuities therein.

In some embodiments, the one or more discontinuities may have a depth that traverses more than one layer of the micro-disc modulator.

In some embodiments, the one or more discontinuities may be disposed at locations that coincide with locations of a secondary or higher mode of resonance in the micro-disc modulator corresponding to a predefined wavelength. In some embodiments, the locations of the one or more discontinuities may correspond to locations of peaks of field intensity of the secondary or higher mode of resonance in the micro-disc modulator.

In some embodiments, the one or more discontinuities may include one or more grooves etched into the top surface of the micro-disc modulator. In some embodiments, the one or more grooves may include at least four arc-shaped grooves of equal dimensions each subtending an angle of 45 degrees at a center of the micro-disc modulator and disposed approximately 45 degrees apart around a circle centered at a center point of the top surface of the micro-disc modulator.

In some embodiments, an outer radius of each of the arc-shaped grooves may be within a predefined range.

In one aspect, an optoelectronic communication apparatus may include a transmitter that includes a first silicon photonic device, a coupler and one or more first heaters. The first silicon photonic device may include a first SOI substrate having a first primary surface and a first silicon photonic structure on the first primary surface of the first SOI substrate. The first silicon photonic structure may include a first silicon waveguide configured to bring in radiation comprising a plurality of wavelengths, a second silicon waveguide configured to carry away radiation comprising the plurality of wavelengths, and a plurality of first modulators disposed between and in proximity of the first and the second silicon waveguides. Each of the plurality of first modulators may correspond to a respective wavelength of the plurality of wavelengths. The coupler may be configured to transfer the radiation from a laser source to the first silicon waveguide to receive a beam of laser from the laser source and transmit the laser in the first silicon waveguide. Each of the one or more first heaters may correspond to and be configured to thermally tune a respective one of the plurality of first modulators such that each of the first modulators has a unique modulator resonance frequency corresponding to a respective wavelength of the plurality of wavelengths with respect to the beam of laser.

In some embodiments, each of the one or more first heaters may be biased by a respective voltage. In some embodiments, the respective voltages of the one or more first heaters may be equal.

In some embodiments, the optoelectronic communication apparatus may further include a receiver that includes a second silicon photonic device and one or more second heaters. The second silicon photonic device may include a second SOI substrate having a second primary surface and a second silicon photonic structure on the second primary surface of the second SOI substrate. The second silicon photonic structure may include a third silicon waveguide optically coupled to the second silicon waveguide. The second silicon photonic structure may also include a plurality of second modulators disposed in proximity of the third silicon waveguide, and a plurality of photodetectorss each of which optically coupled to a respective one of the plurality of second modulators. Each of the one or more second heaters may correspond to and be configured to thermally tune a respective one of the plurality of second modulators such that the plurality of second modulators have a plurality of resonance frequencies, that are different from each other, with respect to the beam of laser.

In some embodiments, each of the one or more second heaters may be biased by a respective voltage. In some embodiments, the respective voltages of the one or more second heaters may be equal.

In some embodiments, at least one of the plurality of modulators may be a micro-disc modulator having a top surface substantially parallel to the first primary surface of the first SOI substrate. The top surface of the micro-disc modulator may include one or more discontinuities therein.

In some embodiments, the one or more discontinuities may be disposed at locations that coincide with locations of a secondary mode of resonance in the micro-disc modulator corresponding to a predefined wavelength. In some embodiments, the locations of the one or more discontinuities may correspond to locations of peaks of field intensity of the secondary mode of resonance in the micro-disc modulator.

In some embodiments, the one or more discontinuities may include one or more grooves etched into the top surface of the micro-disc modulator. In some embodiments, the one or more grooves may include at least four arc-shaped grooves of equal dimensions each subtending an angle of 45 degrees at a center of the micro-disc modulator and disposed approximately 45 degrees apart around a circle centered at a center point of the top surface of the micro-disc modulator. In some embodiments, an outer radius of each of the arc-shaped grooves may be within a predefined range.

In some embodiments, at least one of the plurality of first modulators or the plurality of second modulators may be a micro-disc modulator that includes a first first-type region doped with first-type dopants and a second-type region doped with second-type dopants and in contact with the first first-type region. The first first-type region and the second-type region may form a first p-n junction in which a direction of current flow is perpendicular to the first primary surface of the first SOI substrate. In some embodiments, the micro-disc modulator may include a first disc-shaped layer and a second ring-shaped layer. The first disc-shaped layer may include a first central region and a first peripheral region. The first central region may include a first electrode, and the first peripheral region may include the first first-type region. The second ring-shaped layer may be disposed on the first disc-shaped layer, and may include a second central region and a second peripheral region. The second central region may include a second electrode, and the second peripheral region may include the second-type region.

In some embodiments, the micro-disc modulator may further include a second first-type region doped with first-type dopants and in contact with the second-type region. The second-type region may be disposed on the first first-type region. The second first-type region may be disposed on the second-type region. The second-type region and the second first-type region may form a second p-n junction where a direction of current flow is perpendicular to the first primary surface of the first SOI substrate. In some embodiments, the micro-disc modulator may include a first disc-shaped layer, a second ring-shaped layer and a third ring-shaped layer. The first disc-shaped layer may include a first central region and a first peripheral region. The first central region may include a first electrode, and the first peripheral region may include the first first-type region. The second ring-shaped layer may be disposed on the first disc-shaped layer, and may include a second central region and a second peripheral region. The second central region may include a second electrode, and the second peripheral region may include the second-type region. The third ring-shaped layer may be disposed on the second ring-shaped layer, and may include a third central region and a third peripheral region. The third central region may include a third electrode, and the third peripheral region may include the second first-type region. Any, some or all of the first electrode, the second electrode and the third electrode may be formed by any prevailing methods available with respect to semiconductor fabrication technologies.

In some embodiments, the micro-disc modulator may further include at least one additional ring-shaped layer disposed on the third ring-shaped layer such that the micro-disc modulator comprises three or more ring-shaped layers disposed over the first disc-shaped layer with the first disc-shaped layer and the three or more ring-shaped layers alternatively doped with first-type dopants and second-type dopants.

In one aspect, a method of calibrating an optical link may include powering a laser to provide radiation at a first wavelength to the optical link. The optical link may include a grating coupler, a silicon waveguide optically coupled to the grating coupler, a laser source configured to emit a beam of laser into the grating coupler, a silicon photonic device. The silicon photonic device may include a SOI substrate having a primary surface and a photonic structure on the primary surface of the SOI substrate. The photonic structure may include a plurality of modulators disposed in proximity of the silicon waveguide, each of the modulators having a respective resonance frequency different from resonance frequencies of other modulators of the plurality of modulators. At least one of the modulators may have a disc-shaped layer and a plurality of ring-shaped layers disposed on the disc-shaped layer. The photonic structure may also include a plurality of photodetectors, each of the photodetectors optically coupled to a respective modulator of the plurality of modulators. The optical link may also include a plurality of heaters, each of the heaters corresponding to and configured to vary temperature in a respective modulator of the plurality of modulators. The method may also include measuring and recording an output of each of the plurality of photodetectors; increasing a temperature of each of the plurality of heaters; monitoring the output of each of the plurality of photodetectors; and, in response to the measured output of a first photodetector of the plurality of photodetectors indicating a first modulator of the plurality of modulators approaching resonance, identifying one of the plurality of rings of the first modulator as being an active ring of the first modulator.

In some embodiments, the method may further include: disconnecting power to the plurality of rings of the first modulator except the active ring of the first modulator; recording operating condition of at least the first modulator; and maintaining the output of the first photodetector at zero under quiescent conditions.

In some embodiments, the method may further include: increasing heater power in response to the measured output of the first photodetector indicating no increase in the output of the first photodetector; and measuring the output of the first photodetector.

In some embodiments, the first photodetector indicating the first modulator approaching resonance may include the measured output of the first photodetector having increased.

In some embodiments, the method may further include: in response to the measured output of a second photodetector of the plurality of photodetectors indicating a second modulator of the plurality of modulators approaching resonance, identifying one of the plurality of rings of the second modulator as being n active ring of the second modulator.

In some embodiments, the method may further include: disconnecting power to the plurality of rings of the second modulator except the active ring of the second modulator; recording operating condition of at least the second modulator; and maintaining the output of the second photodetector at zero under quiescent conditions.

In some embodiments, the method may further include: increasing heater power in response to the measured output of the second photodetector indicating no increase in the output of the second photodetector; and measuring the output of a second photodetector.

In some embodiments, the second photodetector indicating the second modulator approaching resonance may include the measured output of the second photodetector having increased.

Additional Notes

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

As used to describe such embodiments, terms such as "above", "below", "upper", "lower", "top", "bottom", "horizontal", "vertical" and "side", for example, describe positions relative to an arbitrary axis of an element. In particular, the terms "above" and "below" refer to positions along an axis, where "above" refers to one side of an element while "below" refers to an opposite side of an element. Relative to terms "above" and "below", the term "side" refers to a side of an element that is displaced from an axis, such as the periphery of the element, for example. Further, it is understood that such terms do not necessarily refer to a direction defined by gravity or any other particular orientation reference. Instead, such terms are merely used to identify one portion versus another portion. Accordingly, "upper" and "lower" may be equivalently interchanged with "top" and "bottom", "first" and "second", "right" and "left", and so on. The term "horizontal" may refer to an orientation perpendicular to an axis while the term "vertical" may refer to an orientation parallel to the same axis, and vice versa.

The terms "and", "and/or" and "or" as used herein may include a variety of meanings that are expected to depend at least in part upon the context in which such terms are used. Typically, the term "or" as well as "and/or", if used to associate a list, such A, B or C, is intended to mean A, B and C, used in the inclusive sense, as well as A, B or C, used in the exclusive sense. In addition, the term "one or more" as used herein may be used to describe any feature, structure, or characteristic in the singular or plural sense to describe some combination of features, structures or characteristics. Though, it should be noted that this is merely an illustrative example and the claimed subject matter of the present disclosure is not limited to this example.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A device comprising:
  a silicon-on-insulator (SOI) substrate having a first primary surface; and
  a photonic structure on the first primary surface of the SOI substrate, the photonic structure comprising:
    a silicon waveguide; and
    a silicon micro-disc modulator adjacent to the silicon waveguide, the micro-disc modulator having a top surface substantially parallel to the first primary surface of the SOI substrate, the top surface comprising one or more discontinuities therein, wherein the one or more discontinuities are disposed at locations that coincide with locations of a secondary or higher order mode of resonance in the micro-disc modulator corresponding to a predefined wavelength.

2. The device of claim 1, wherein the locations of the one or more discontinuities correspond to locations of peaks of field intensity of the secondary or higher order mode of resonance in the micro-disc modulator.

3. The device of claim 1, wherein the one or more discontinuities comprise one or more grooves etched into the top surface of the micro-disc modulator.

4. The device of claim 3, wherein the one or more grooves comprise at least four arc-shaped grooves of equal dimensions each subtending an angle of 45 degrees at a center of the micro-disc modulator and disposed approximately 45 degrees apart around a circle centered at a center point of the top surface of the micro-disc modulator.

5. The device of claim 4, wherein an outer radius of each of the arc-shaped grooves is within a predefined range.

6. The device of claim 1, wherein the micro-disc modulator comprises:
  a first first-type region doped with first-type dopants; and
  a second-type region doped with second-type dopants and in contact with the first first-type region,
  wherein the first first-type region and the second-type region form a first p-n junction where a direction of current flow is perpendicular to the first primary surface of the SOI substrate.

7. The device of claim 6, wherein the micro-disc modulator comprises:
  a first disc-shaped layer having a first central region and a first peripheral region, the first central region being a first electrode, the first peripheral region being the first first-type region; and
  a second ring-shaped layer disposed on the first disc-shaped layer, the second ring-shaped layer having a second central region and a second peripheral region, the second central region being a second electrode, the second peripheral region being the second-type region, a center of the second central region is etched away to form a hole to provide an electrical contact to the first first-type region.

8. The device of claim 6, wherein the micro-disc modulator further comprises:
  a second first-type region doped with first-type dopants and in contact with the second-type region,
  wherein the second-type region is disposed on the first first-type region,
  wherein the second first-type region is disposed on the second-type region, and
  wherein the second-type region and the second first-type region form a second p-n junction where a direction of current flow is perpendicular to the first primary surface of the SOI substrate.

9. The device of claim 8, wherein the micro-disc modulator comprises:
  a first disc-shaped layer having a first central region and a first peripheral region, the first central region being a first electrode, the first peripheral region being the first first-type region which is photonically active;
  a second ring-shaped layer disposed on the first disc-shaped layer, the second ring-shaped layer having a second central region and a second peripheral region, the second central region being a second electrode, the second peripheral region being the second-type region which is photonically active; and
  a third ring-shaped layer disposed on the second ring-shaped layer, the third ring-shaped layer having a third central region and a third peripheral region, the third central region being a third electrode, the third peripheral region being the second first-type region.

10. The device of claim 9, wherein the micro-disc modulator further comprises:
at least one additional ring-shaped layer disposed on the third ring-shaped layer such that the micro-disc modulator comprises three or more ring-shaped layers disposed over the first disc-shaped layer with the first disc-shaped layer and the three or more ring-shaped layers alternatively doped with first-type dopants and second-type dopants.

11. A device comprising:
a silicon-on-insulator (SOI) substrate having a first primary surface; and
a photonic structure on the first primary surface of the SOI substrate, the photonic structure comprising:
a silicon waveguide; and
a micro-disc modulator adjacent to the silicon waveguide, the micro-disc modulator comprising:
a first layer having a first first-type region doped with first-type dopants; and
a second layer disposed on the first layer, the second layer having a second-type region doped with second-type dopants and in contact with the first first-type region,
wherein the first first-type region and the second-type region form a first p-n junction where a direction of current flow is perpendicular to the first primary surface of the SOI substrate, and wherein the first layer comprises a first disc-shaped layer that includes a first central region and a first peripheral region with the first central region being a first electrode and the first peripheral region being the first first-type region, and wherein the second layer comprises a second ring-shaped layer that includes a second central region and a second peripheral region with the second central region being a second electrode and the second peripheral region being the second-type region.

12. The device of claim 11, wherein the micro-disc modulator further comprises:
a third layer having a second first-type region doped with first-type dopants and in contact with the second-type region of the second layer,
wherein the second-type region is disposed on the first first-type region,
wherein the second first-type region is disposed on the second-type region, and
wherein the second-type region and the second first-type region form a second p-n junction where a direction of current flow is perpendicular to the first primary surface of the SOI substrate.

13. The device of claim 12, wherein the first layer comprises a first disc-shaped layer that includes a first central region and a first peripheral region with the first central region being a first electrode and the first peripheral region being the first first-type region, wherein the second layer comprises a second ring-shaped layer that includes a second central region and a second peripheral region with the second central region being a second electrode and the second peripheral region being the second-type region, and wherein the third layer comprises a third ring-shaped layer that includes a third central region and a third peripheral region with the third central region being a third electrode and the third peripheral region being the second first-type region.

14. The device of claim 13, wherein the micro-disc modulator further comprises:
at least one additional ring-shaped layer disposed on the third ring-shaped layer such that the micro-disc modulator comprises three or more ring-shaped layers disposed over the first disc-shaped layer with the first disc-shaped layer and the three or more ring-shaped layers alternatively doped with first-type dopants and second-type dopants.

15. The device of claim 11, wherein the micro-disc modulator further comprises a top surface substantially parallel to the first primary surface of the SOI substrate, the top surface comprising one or more discontinuities therein.

16. The device of claim 15, wherein the one or more discontinuities have a depth that traverses more than one layer of the micro-disc modulator.

17. The device of claim 15, wherein the one or more discontinuities are disposed at locations that coincide with locations of a secondary or higher mode of resonance in the micro-disc modulator corresponding to a predefined wavelength.

18. The device of claim 17, wherein the locations of the one or more discontinuities correspond to locations of peaks of field intensity of the secondary or higher mode of resonance in the micro-disc modulator.

19. The device of claim 15, wherein the one or more discontinuities comprise one or more grooves etched into the top surface of the micro-disc modulator.

20. The device of claim 19, wherein the one or more grooves comprise at least four arc-shaped grooves of equal dimensions each subtending an angle of 45 degrees at a center of the micro-disc modulator and disposed approximately 45 degrees apart around a circle centered at a center point of the top surface of the micro-disc modulator.

21. The device of claim 20, wherein an outer radius of each of the arc-shaped grooves is within a predefined range.

* * * * *